US007904323B2

(12) United States Patent
Wynn et al.

(10) Patent No.: US 7,904,323 B2
(45) Date of Patent: Mar. 8, 2011

(54) MULTI-TEAM IMMERSIVE INTEGRATED COLLABORATION WORKSPACE

(75) Inventors: Eleanor H. Wynn, West Linn, OR (US); Don Meyers, Rescue, CA (US); Cynthia K. Pickering, Phoenix, AZ (US); Paul B. Anders, Phoenix, AZ (US); Nathan Zeldes, Jerusalem (IL); Mark P. Chuang, San Jose, CA (US); Tammie D. Hertel, Chandler, AZ (US); Charles H. House, Park City, UT (US)

(73) Assignee: Intel Corporation, Hillsboro, OR (US)

( * ) Notice: Subject to any disclaimer, the term of this patent is extended or adjusted under 35 U.S.C. 154(b) by 2199 days.

(21) Appl. No.: 10/753,217

(22) Filed: Dec. 23, 2003

(65) Prior Publication Data

US 2004/0261013 A1 Dec. 23, 2004

Related U.S. Application Data

(60) Provisional application No. 60/480,895, filed on Jun. 23, 2003.

(51) Int. Cl.
- *G05B 19/418* (2006.01)
- *G06F 9/46* (2006.01)
- *G06F 15/16* (2006.01)
- *G06F 15/173* (2006.01)
- *G06F 3/00* (2006.01)
- *G06F 3/048* (2006.01)

(52) U.S. Cl. ............. 705/8; 709/204; 709/205; 709/201; 709/226; 715/744; 715/765

(58) Field of Classification Search ...... 705/8; 709/201, 709/204, 205, 226; 715/744, 765
See application file for complete search history.

(56) References Cited

U.S. PATENT DOCUMENTS

| | | | | |
|---|---|---|---|---|
| 6,014,135 A * | 1/2000 | Fernandes | ...................... | 715/744 |
| 6,119,147 A * | 9/2000 | Toomey et al. | ............... | 709/204 |
| 6,769,013 B2 * | 7/2004 | Frees et al. | ...................... | 709/205 |
| 6,791,582 B2 * | 9/2004 | Linsey et al. | .................. | 715/751 |
| 6,957,395 B1 * | 10/2005 | Jobs et al. | ...................... | 715/765 |
| 7,030,890 B1 * | 4/2006 | Jouet et al. | ...................... | 345/619 |
| 7,065,493 B1 * | 6/2006 | Homsi | ............... | 705/8 |
| 7,082,430 B1 * | 7/2006 | Danielsen et al. | ............... | 707/10 |
| 7,155,435 B1 * | 12/2006 | Day et al. | ......................... | 707/10 |
| 7,159,178 B2 * | 1/2007 | Vogt et al. | ...................... | 715/733 |
| 7,634,539 B2 * | 12/2009 | Schwarz et al. | ............... | 709/204 |
| 2002/0085025 A1 * | 7/2002 | Busis et al. | ................... | 345/738 |
| 2003/0135565 A1 | 7/2003 | Estrada | | |

(Continued)

OTHER PUBLICATIONS

Scott Hamilton (Aug. 2001). A better way to manage product development. Machine Design, 73(16), 80-86. Retrieved Nov. 12, 2007, from ABI/INFORM Global database. (Document ID: 79133722).*

(Continued)

*Primary Examiner* — Beth V Boswell
*Assistant Examiner* — Folashade Anderson
(74) *Attorney, Agent, or Firm* — Marger Johnson & McCollom

(57) ABSTRACT

A collaborate workspace offers a set of integrated components. Within a project, users may view avatars representing other team members, view the current schedule, add or change meetings, update documents, complete deliverables, and interact with team members around the world. Other projects are shown in the background, enabling users to easily and quickly switch between projects and be informed about actions occurring in the background tasks.

23 Claims, 30 Drawing Sheets

U.S. PATENT DOCUMENTS

2008/0059570 A1* 3/2008 Bill .............................. 709/203
2010/0205541 A1* 8/2010 Rapaport et al. ............. 715/753

OTHER PUBLICATIONS

Koji Kida, Hideo Shimazu ( 2002). Ubiquitous Knowledge Management. IEEE Computer Society, 0-7695-1778-1/02, Retrieved Nov. 12, 2007, from IEEE http://ieeexploreieee.org/ie15/8185/24595/01115170.pdf?arnumber=1115170.*

CoCreate Earns Microsoft .NET Connected Logo for OneSpace.net. (Aug. 11). PR Newswire,1. Retrieved Nov. 12, 2007, from Business Dateline database. (Document ID: 382826871).*

Scott Hamilton (Aug. 2001). A better way to manage product development. Machine Design, 73(16), 80-86. Retrieved Jun. 6, 2008, from ABI/INFORM Global database. (Document ID: 79133722).*

"Jive Software—Powerful Discussion Forum Software." Jive Software. access from Http://We.Archive.Org. May 24, 2008 <http://www.jivesoftware.com>. Mar. 1, 2003.*

"Key Features: A look at What's Possible." Project.net. access from http://We.Archive.Org. Jun. 4, 2008 <http://www.project.net>. Apr. 14, 2003.*

Bafoutsou, Georgia, and Gregory Mentzas. "A Comparative Analysis of Web-Based Collaborative Systems." IEEE 2001: 496-500.*

Romano, Nicholas C., Fang Chen, and Jay F. Nunamaker. Proceedings of the 35th Hawaii International Conference on System Science. 2002, IEEE. IEEE, 2002.*

Quax, Peter, Tom Jehaes, Pieter Jorissen, and Wim Lamotte. "A Multi-User Framework Supporting Video-Based Avatars." Netgames Jun. 2003: 137-147.*

Bergstein, Brian. "The Virtual Watercooler." Express May 12, 2008: 10.*

Lin, Qingpin, Chor Low, Jim Ng, Juan Bu, and Xiaohua Lui. "Multiuser Collaborative Work in Virtual Environment Based CASE Tool." Information and Science Technology 2003: 253-267.*

Eurich, Mali. (May 6, 2002). Becoming a keyboard whizz [2 Edition]. Evening Standard,p. 14. Retrieved Apr. 4, 2009, from ProQuest Newsstand database. (Document ID: 252366111).*

Pyron, Tim. Sams Teach Yourself Microsoft Project 2000. USA: Sams, 2000.*

"Flashin Links Script." Dynamic Drive. Jan. 2, 2002. Apr. 3, 2009.*

"Team Directory" enlargement graphics from Project.net. from www.project.net, Feb. 11, 2003.*

John Fontana. (Aug. 2002). Groove hooks up with cousin Notes. Network World, 19(33), 16. Retrieved Nov. 9, 2010, from ABI/INFORM Global. (Document ID: 154525501).*

Udell, John (Reviewer). (May 2002). Groupware: Getting into the Groove. ComputerWorld Canada, 18(10), . Retrieved Nov. 9, 2010, from CBCA Complete. (Document ID: 588028991).*

Intraspect Software and Groove Networks Partner to Deliver Comprehensive Collaboration Solution. (Oct. 29). PR Newswire,1. Retrieved Nov. 9, 2010, from Business Dateline. (Document ID: 86821697).*

Jon Udell. (Feb. 2003). In the same . InfoWorld, 25(7), 19-22. Retrieved Nov. 9, 2010, from ABI/INFORM Global. (Document ID: 290638111).*

* cited by examiner

1505

Project 1 Schedule

Alice Abrams
 Brian Barker

6 AM     12 PM     6 PM
Tuesday, 18 Mar 2003

1510

Project 1 Schedule

Brian Barker
 Charles Cooper

6 AM     12 PM     6 PM
Tuesday, 18 Mar 2003

MULTI-TEAM IMMERSIVE INTEGRATED COLLABORATION WORKSPACE

RELATED APPLICATION DATA

The application claims the benefit of U.S. Provisional Patent Application Ser. No. 60/480,895, filed Jun. 23, 2003.

FIELD OF THE INVENTION

This invention pertains to collaboration, and more particularly to providing an integrated collaboration workspace for teams of users.

BACKGROUND OF THE INVENTION

In today's global economy, teams of users may be distributed around the world. For example, one team member might be located in Oregon, another in Australia, a third in Israel, and a fourth in Russia. That team members may be scattered around the world introduces new complications into coordinating team efforts.

The most obvious complication is that team members may not sit down together in a single room without extensive traveling. Although theoretically possible for occasional use, arranging for all team members to travel to a single location to meet is often expensive, in money and especially in time. The cost of arranging travel for each team member may be prohibitive, and the time needed for travel and to allow the team members to acclimate to the local time zone may often run into days. For projects with relatively short deadlines, the time cost involved in travel may often be the more prohibitive factor against travel.

But because the earth is divided into multiple time zones, coordinating video-or tele-conferencing may be just as complex. For example, there is a 10-hour time difference between the Oregon and Israel. When it is 9:00 AM in Oregon, it is 7:00 PM in Israel. Factor in team members in other parts of the world, and it may be impossible to find a time to hold the meeting that is convenient to everyone's work schedule. As a result, some participants are forced to conference in to meetings at very awkward times.

The physical separation of team members has other affects beyond the inconvenience of scheduling meetings. This is isolating: limiting interaction to e-mail and telephone conversations does not let team members get to know one another. This lack of knowledge about other team members may have an impact on individual and team performance, which costs money. It is important the team members know one another: for example, their strengths and weaknesses, their work habits, and their culture.

Further complicating everything is that users are often working on more than one project at a time. Studies have shown that, on average, users participate in 3-10 projects at one time. Even if it is possible for a user to interact with team members of one project, such interaction comes at the expense of interaction with team members on other projects.

Some tools exist to attempt to address the problem of dispersed team members. For example, Instant messaging tools provide ways to quickly communicate one user to another. Microsoft® offers several software products, including SharePoint™, Office, and NetMeeting®. SharePoint is a document management system. It allows members of a team to share documents and other information. But SharePoint provides no way to connect multiple projects. For example, if a user wants to share a document across three different projects, the user has to connect to each project individually and add the documents to the project. In addition, the copies of the documents are not connected. SharePoint is also a hierarchical software package: using SharePoint requires working from the "top" of the software down to the desired functionality. Microsoft Office is a set of software programs, including Word, Excel, and Outlook® among others, for performing various tasks. And Microsoft NetMeeting® is software that provides for network conferencing. (Microsoft, SharePoint, Outlook, and NetMeeting are either registered trademarks or trademarks of Microsoft Corporation in the United States and/or other countries.)

Groove Networks®, Inc. offers software that allows real-time peer-to-peer interaction. Groove Networks software allows users to set up groups, but is otherwise outside not workflow oriented. Groove Networks software provides no interoperability, and no structure.

Documentum, Inc. offers eRoom, which is a document management system, but it is little more than a document drop. eRoom does not provide for teamwork or multiple teams, and any functionality other than document management is an add-on to the basic eRoom software. (Documentum and eRoom are either trademarks or registered trademarks of Documentum, Inc.)

Finally, ThinkDesk™ by Outhink, Inc., is a workflow tool. It acknowledges that users are sometimes involved in multiple projects simultaneously, and offers a drag-and-drop interface. But it does not allow users to see all of their projects at once. It does not allow users to be able to locate other team members, easily schedule and manage meetings, or in general engage in activities that involve the entire team.

As may be seen, all of these solutions are flawed. Some, like instant messaging, Microsoft NetMeeting, and the software offered by Groove Networks, Inc., are dedicated to individual tasks, and do not address the problem as a whole, or are entirely outside the space of the problem. Others, like Microsoft SharePoint, Documentum eRoom, and Outhink ThinkDesk, are designed around a single core strength of the business offering the product. The other functionalities have poor designs and do not integrate well with the core product. Microsoft Office includes several different software programs, all of which were designed and implemented separately, without any concern for integration. Although offered now as a suite and capable of exchanging information between the individual software programs, the individual software programs were not originally designed to work together. Offering the individual software programs as a suite required creating "glue code" to allow them to work together. Except for Outhink ThinkDesk, none of these solutions acknowledges that users may be working on multiple projects simultaneously. And even Outhink ThinkDesk, while acknowledging the possibility of multiple projects, does not let users work in all projects simultaneously.

As an example of the lack of integration, consider the situation where a user receives an e-mail message about a meeting. In Microsoft Outlook, if the user drags the e-mail message onto the calendar tool, Microsoft Outlook will obligingly open a new appointment, for the meeting. But no fields of the new appointment are filled in: the user has to manually search the message to find the relevant information and manually schedule the meeting.

In fairness to Microsoft Outlook, the program does offer a way to e-mail an appointment so that, upon acceptance by the recipient, the appointment is completely scheduled in the recipient's calendar. But to send the appointment requires digging through menus within the program in a non-intuitive manner for a rather buried feature.

In addition, when a user is working with one tool, it completely dominates the user's attention. The user has no easy way to access other tools without completely diverting attention away from the dominant tool. The user also has no way to find out about actions occurring on other projects.

These products all assume that a user works on only one project at a time. The products offer no easy way to switch between projects, or even recognize that a user might be involved in more than one project.

Finally, these products, to the limited extent that they offer any sort of integration, are limited to integration n with their own tools. There is no way for these products to interact properly with software written by others, or running on a different hardware architecture.

DETAILED DESCRIPTION

Figure 1A:
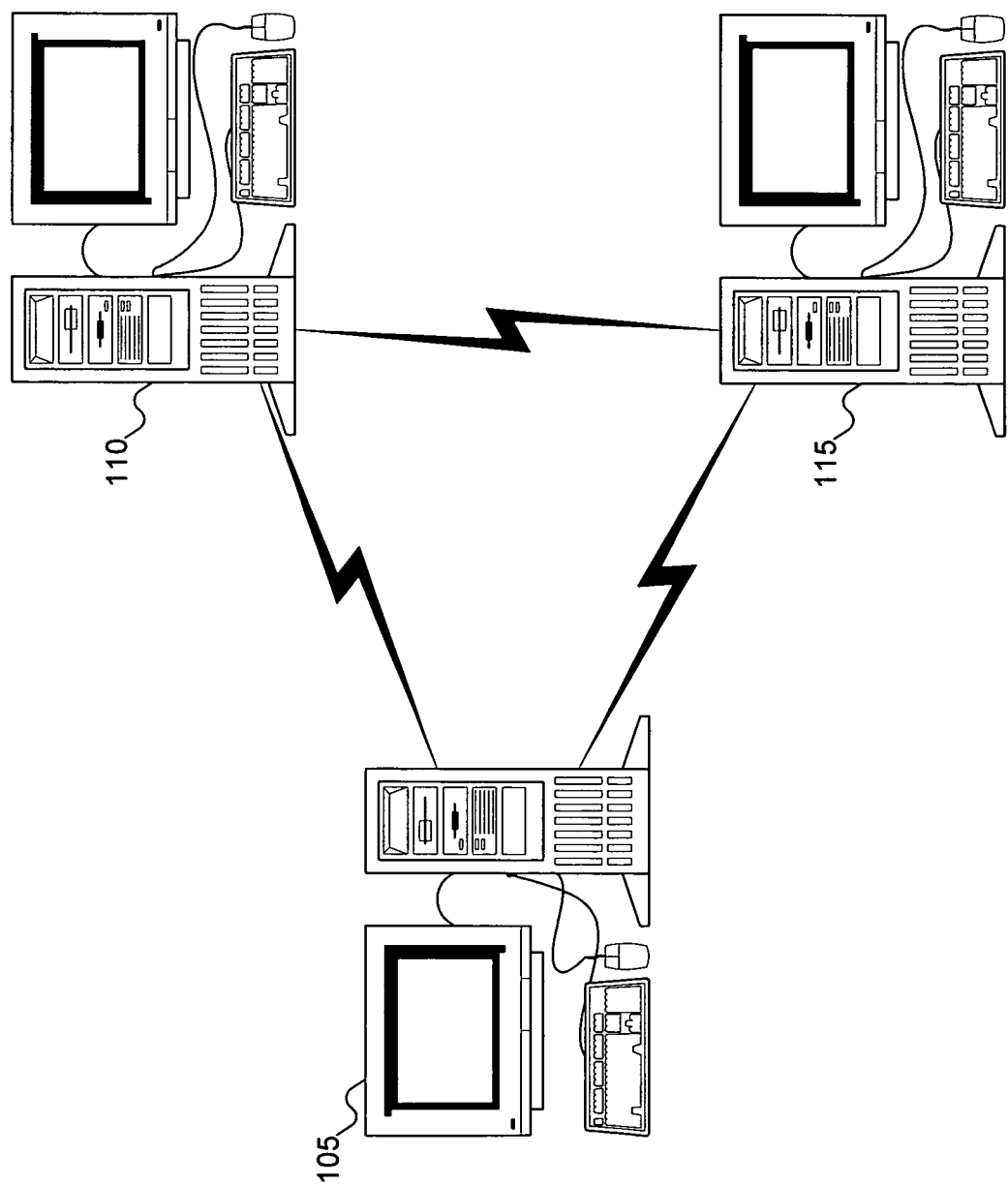
FIGS. 1A-1C show systems for using in a collaborative workspace, according to embodiments of the invention.

The hardware and software used to implement an embodiment of the invention may operate in accord with a client-server model. The client hardware may be any variety of computer located convenient to the user. For example, the client may be a desktop computer, a laptop computer, a personal digital assistant (PDA), or even a terminal (with no local computing ability). The server hardware may be any variety of computer as well, although if the client is a terminal, the server would provide the processing power for the terminal.

The software on the client and server implement the embodiments of the invention described above. The server stores information about the project (and, by extension, about other projects, possibly including projects to which the user is not a member). Projects are also sometimes called collaborative workspaces. There may also be several servers, each storing information about different projects, and as will be appreciated by one skilled in the art, the servers may be used for other purposes as well. Additional servers may also act as backup servers to the primary, to ensure redundant copies of project information in case the primary server fails or to provide additional processing power in case the primary server is overloaded. If there are multiple servers, each managing different projects, then typically there is a "telephone directory" somewhere, identifying which project is stored on which server. This enables the client to communicate with each server about projects stored on that server.

It will be appreciated that various technologies may be used to implement the "telephone directory" or various embodiments of the invention. For example, "web services" type technology may be utilized to coordinate client and server participation in a project. "Web services," as the phase is used herein, describes a standardized way of describing, discovering, and integrating network applications, services and resources using open standards, such as World Wide Web Consortium (W3C) and Internet Engineering Task Force (IETF) standards, including XML (Extensible Markup Language), SOAP (Simple Object Access Protocol), WSDL (Web Services Description Language), UDDI, UPnP (Universal Plug and Play), etc., over a network, such as the Internet or other network. Accordingly, these or other technologies may be used to describe and/or discover various components that may comprise one or more embodiments of the invention.

The server stores any information that should be centralized. For example, users may be members of multiple projects, and so the user's schedule may affect multiple projects. Thus, the user's schedule should be centralized. Similarly, documents that any team member may edit are stored on the server. On the other hand, data that does not change or that is pertinent to a single user only may be stored on the client, although it will be appreciated that the server may be used to cache or backup a client's data. A person skilled in the art will recognize which data typically are stored on the server and which are stored on the client.

The client and server communicate as needed to keep the user up-to-date on projects. The client stores the software to carry out any commands requested by the user (although carrying out the commands may involve retrieving data from the server). The client sends messages to the server to update data on the server. For example, if the user blocks out some time in his or her schedule, the client communicates this information to the server, so that the server may propagate this change to other projects and users as needed. Similarly, the server communicates with the client as needed. For example, if a change is to be propagated to the user, the server notifies the client about the change, so that the client may notify the user.

The client and server are connected via some communications mechanism. Often, the communications mechanism is a network, although a person skilled in the art will recognize that the client and server may communicate in other ways: for example, by being directly connected in some manner. The network may be any variety of network: for example, Ethernet (either Megabit or Gigabit Ethernet) or a wireless network utilizing Bluetooth or any of the IEEE 802.11a/b/g standards, among others. (The Bluetooth standard may be found at "http: ##www.bluetooth.com#dev#specifications.asp," and the IEEE 802.11a/b/g standards may be found online at "http: ##standards.ieee.org#catalog#olis#lanman.html" (to avoid inadvertent hyperlinks, forward slashes ("/") in the preceding uniform resource locator (URL) have been replaced with pound signs ("#")).

In another embodiment of the invention, the hardware and software used to implement embodiments of the invention may be offer a peer-to-peer communication model. In such a model, all information typically is distributed: there is no centralized location where data is stored. The computers are networked in any manner desired, similar to the network described above for the client-server model. In such an embodiment of the invention, the client computers communicate with each other directly, requesting data as needed. But a person skilled in the art will recognize that the peer-to-peer network may include a server, instead of being limited to client-client communication. The server may act as a central hub through which communications between the clients pass, or it may act as a central repository, providing a centralized backup of data otherwise stored on the clients. A person skilled in the art will recognize other ways in which a server may be used in a peer-to-peer network.

For example, if a user wants to schedule a meeting, his or her computer sends a request to all other computers in the network, requesting the schedules of users. Once all schedules are received, the user's computer then shows everyone's schedules, allowing the user to schedule the meeting at a time convenient to everyone. Once scheduled, notice of the meeting is forwarded to all the other computers, so that the other team members are notified about the meeting.

In a similar manner, information may be sent without warning to a computer in the peer-to-peer network. For example, suppose a user has completed an action in a project. That user's computer sends notice that the action was completed to the other computers in the peer-to-peer network. Other team members on that project may then be notified that the action occurred.

Figure 1B:
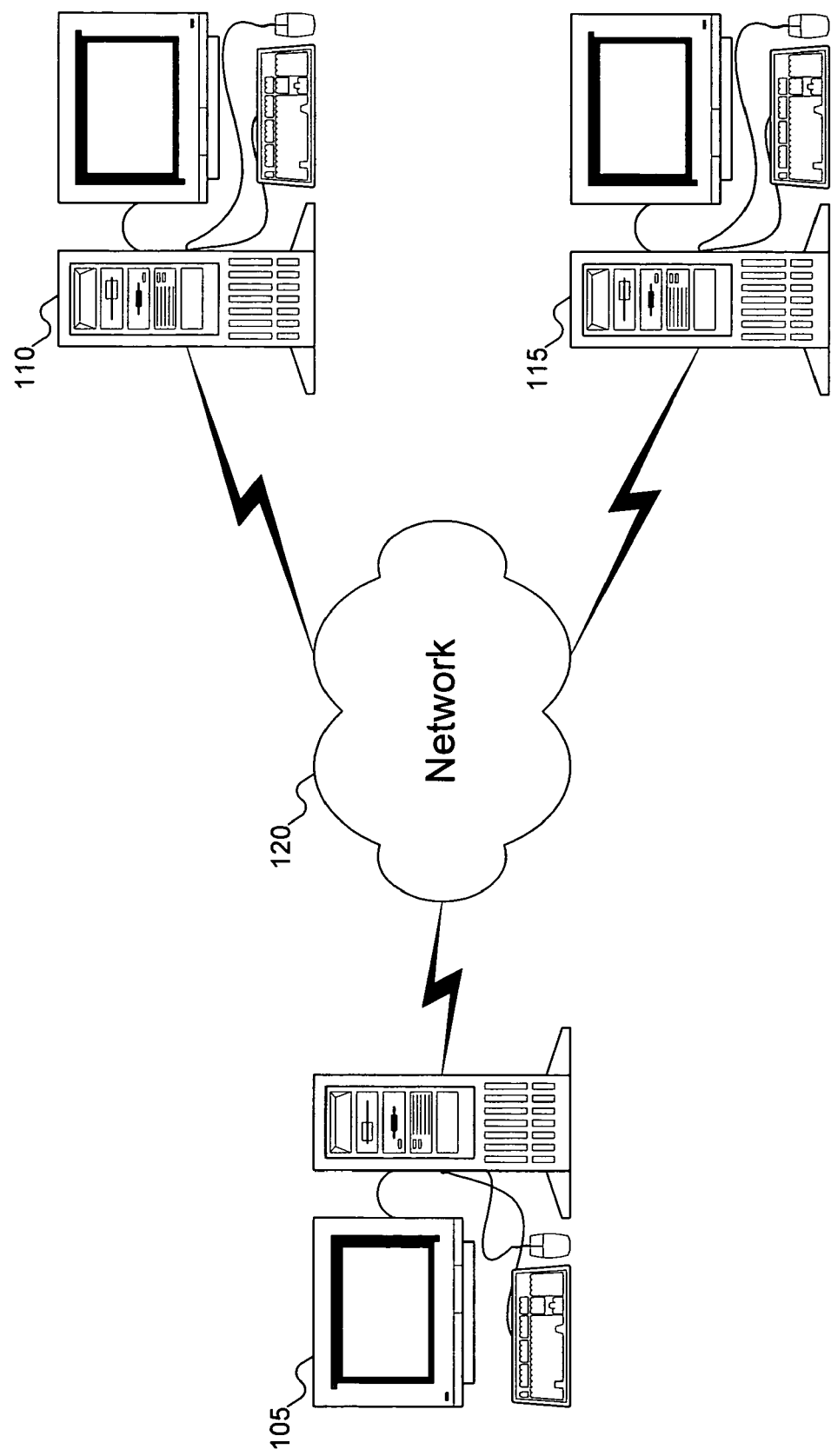
Figure 1C:
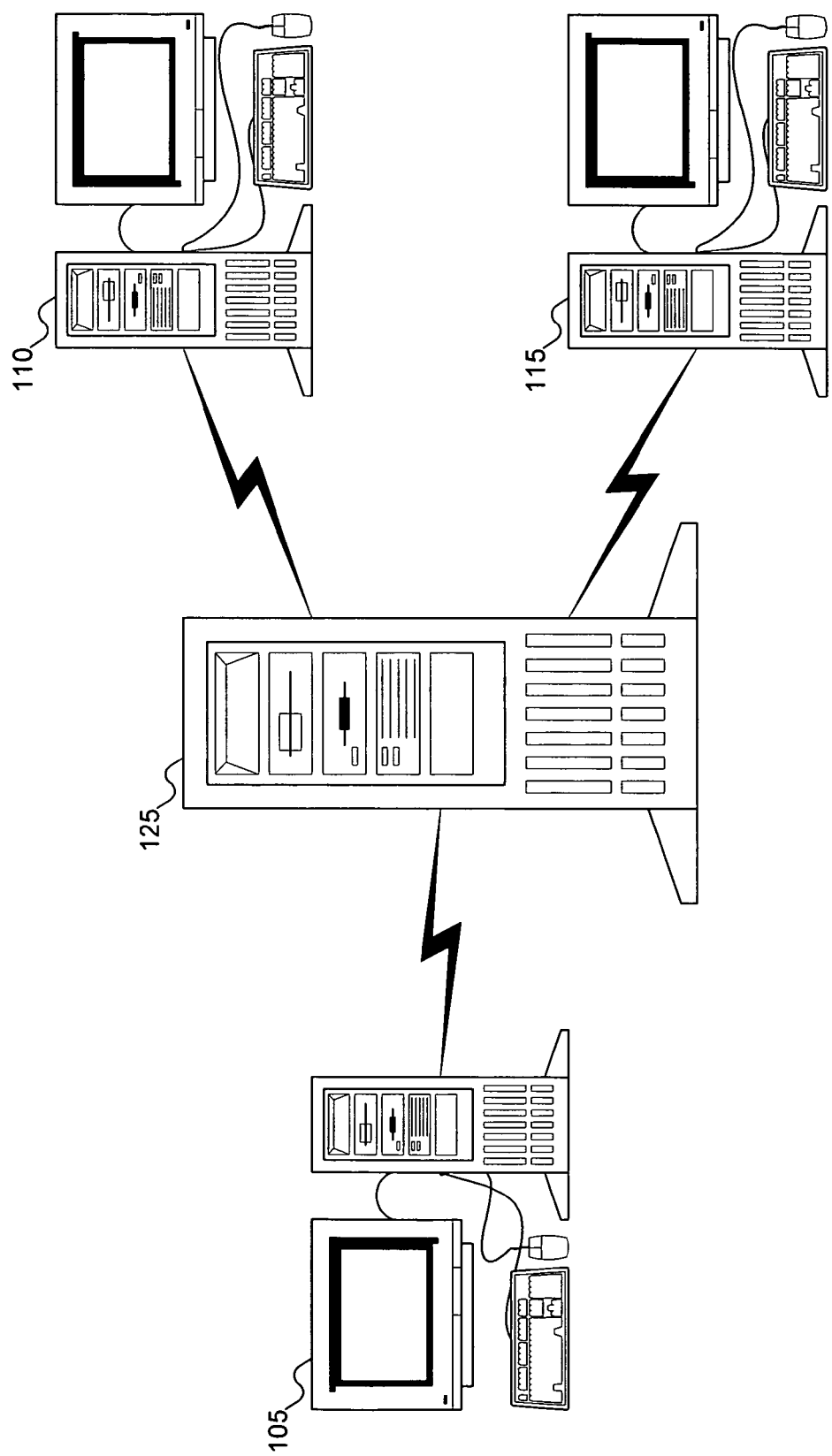

FIGS. 1A-1C show three computers connected according to embodiments of the invention. In FIG. 1A, computers 105, 110, and 115 are directly connected. The embodiment of FIG. 1A may be representative of a peer-to-peer configuration where the computers are connected by a network. In contrast, FIG. 1B shows computers 105, 110, and 115 connected via network 120. FIG. 1B may be representative of a peer-to-peer configuration using a network. Finally, in FIG. 1C, server 125 acts as a centralized location through which the collaborative workspace operates. A person skilled in the art will recognize that server 125 may be connected to network 120 of FIG. 1B, that there may be fewer or more than three computers, and other ways in which computers 105, 110, and 115 may be connected.

Figure 2:
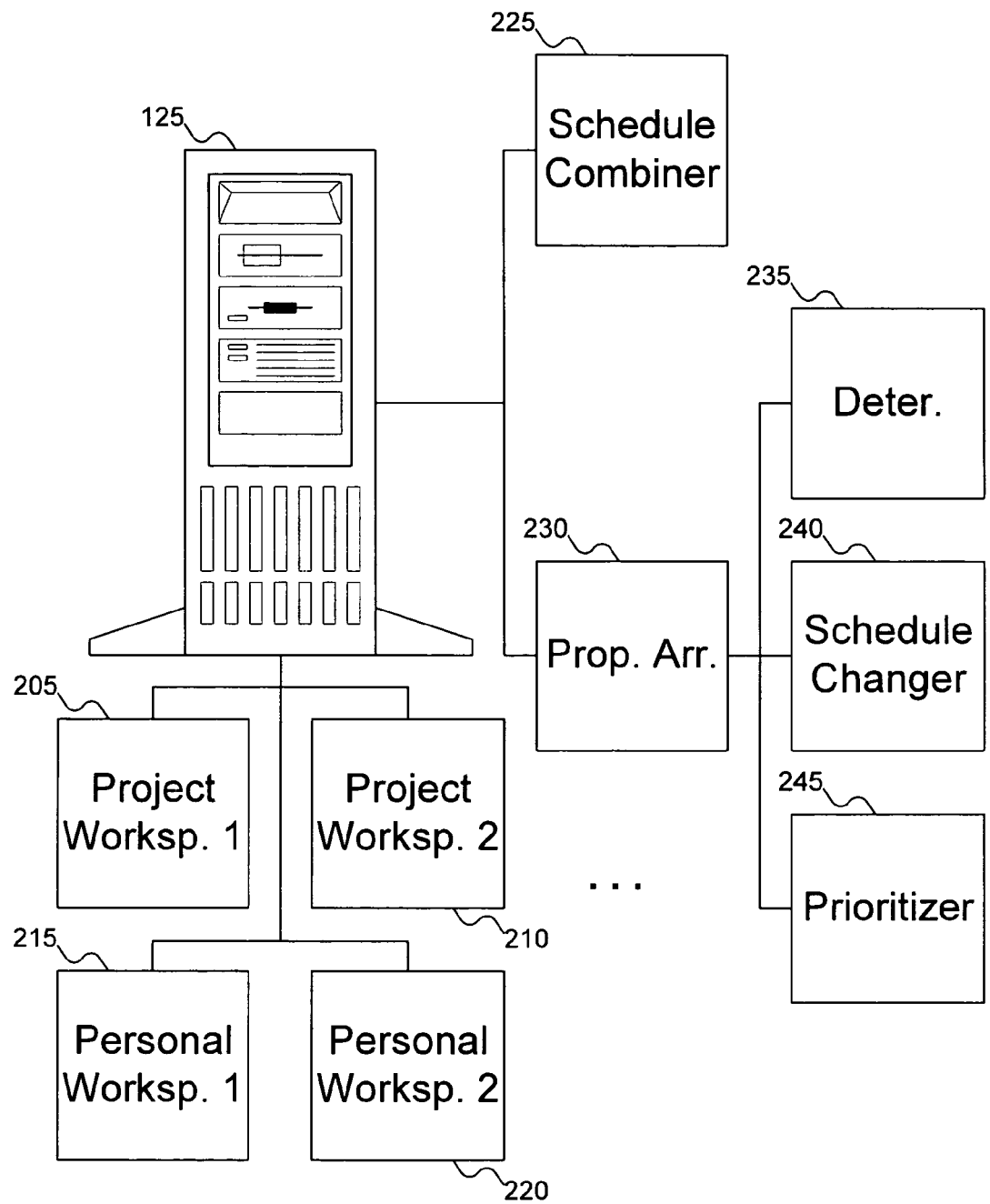
FIG. 2 shows software used to implement the collaborative workspace in the system of FIGS. 1A-1C, according to an embodiment of the invention.

FIG. 2 shows software used to implement the collaborative workspace in the system of FIGS. 1A-1C, according to an embodiment of the invention. In FIG. 2, server 125 is shown, suggesting the client-server model of FIG. 1C, but a person skilled in the art will recognize that any of computers 105, 110, and 115 may be substituted for server 125 in other embodiments.

Server 125 is shown including project workspaces 205 and 210, and may include more project workspaces as needed. Project workspaces 205 and 210 are places where users may work together on projects. Server 125 also includes personal workspaces 215 and 220, which are places where users may monitor their projects and maintain things of personal interest.

Server 125 includes schedule combiner 225, which is responsible for rolling schedules together. As will be discussed further with reference to FIGS. 14A-14B below, multiple schedules may be rolled together to present a combined view to a user. Server 125 also includes propagation arrangement 230, which is responsible for propagating changes across projects. Propagation arrangement 230 includes determiner 235, which determines user/project combinations and whether any conflicts exist, schedule changer 240, which changes schedules as needed when conflicts arise, and prioritizer 245, which determines relative priority between two projects to resolve conflicts.

An embodiment of the invention is a collaborative workspace in which individual users may keep track of all of the projects on which they are working, and in which individual users may see the progress of the project as a whole. The embodiments of the invention enable team members to be easily found and to become organized. Work on the project is coordinated from a single work environment. The collaborative workspace enables interaction with remote colleagues without necessitating communicating at awkward times. Team members may easily determine who is currently available, what the schedules of the individual team members look like, and who has done what on the project.

Figure 3:
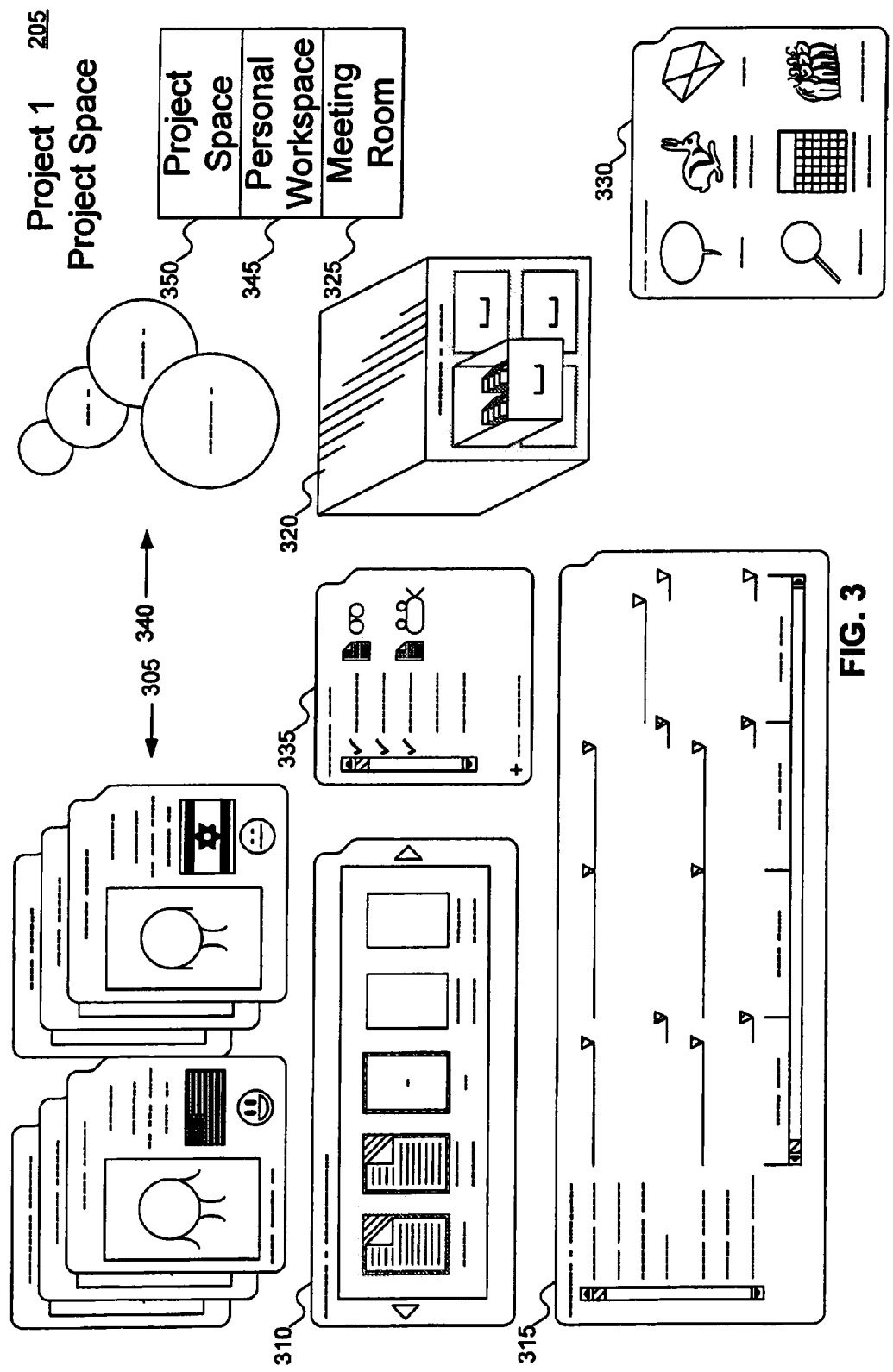
FIG. 3 shows a collaborative workspace as used in the systems of FIGS. 1A-1C, according to an embodiment of the invention.

An embodiment of the invention includes project space 205, as shown in FIG. 3. Project space 205 provides a mechanism by which the members of a single project may (for example, visually) track progress in working on the project, keep track of the other team members, and coordinate work and communication, among other functions. Among other elements, the project space may include avatars 305 of individual users, a place to drop deliverables 310, a team schedule 315, a data repository 320, a link to a meeting room 325, and a tool set 330. FIG. 3 also shows meeting list 335, links 340 to other projects, link 345 to a user's personal workspace, and link 350 to the project space. Each of these elements is discussed in turn below.

Figure 4:
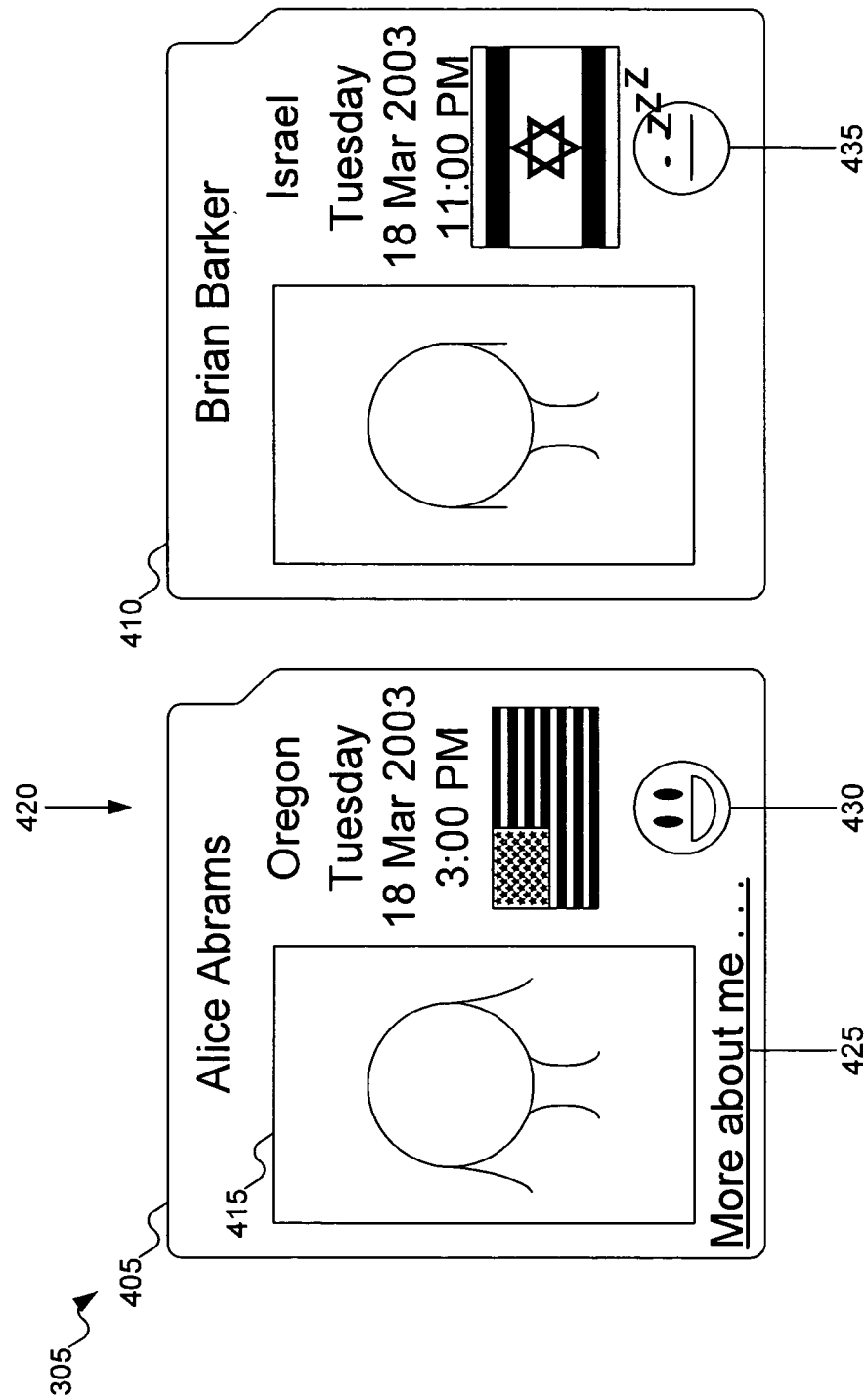
FIG. 4 shows details about the avatars of the collaborative workspace of FIG. 3, according to an embodiment of the invention.

Avatars 305, shown in greater detail in FIG. 4, represent the individual members (sometimes called "team members") of the project. For example, avatar 405 represents Alice Abrams, whereas avatar 410 represents Brian Barker. The avatars let individual team members know about the other members of the team. The avatars are customizable, so that each team member may include the information he or she wants to include. Typically, at a minimum an avatar includes a picture of the team member, information about the team member's location, and the local day and time at the team member's location. For example, avatar 405 includes picture 415, and location, local day, and local time 420. Location, day, and time information may be useful in keeping track of schedules as the earth rotates around its axis. When it is 3:00 PM in Oregon, it is 11:00 PM in Israel. Thus, Alice knows that unless Brian is working an unusual schedule, he probably asleep at this time.

The avatars may also include any additional information the user wants to make available to team members. For example, an avatar may include a video or audio segment of the team member, so that other team members may get a better feel for whom the team member is. Or the avatar may include a link to photos from the user's most recent vacation. For example, avatar 405 includes link 425.

The avatar may also include a (iconic) mood indicator, letting other team members know how the team member is currently feeling. For example, if the team member is in his or her office and everything is fine, the avatar may include an icon showing a smiley face. Mood indicator 430 shows everything is currently fine for Alice. But if the team member is sick, the avatar may include an icon showing a sad face, with a thermometer in its mouth and a hot water bag on its head. Or if the team member is currently asleep (for example, if the current local time is between 10:00 PM and 6:00 AM), the avatar may include an icon with eyes shut and "Zzz"s overhead, as shown in mood indicator 435 in avatar 410 for Brian.

Although the mood indicator may be changed by the user according to his or her current mood, the mood indicator may also be predictive. A predictive mood indicator attempts to guess at the user's current mood, without the user actually indicating the mood directly. For example, the mood indicator may predict that the user is asleep outside of normal working hours (whatever is considered "normal" for the user, given his or her current location and typical work hours, among other factors). The mood indicator may identify the user as traveling, if the user's current schedule shows him or her as traveling. The mood indicator may predict the user as being in a poor mood (or just plain angry) if the user's schedule shows him or her as having work due in a short frame of time. (The mood indicator may also show gradations of anger, depending on how much work the user has due, and how short the time frame is for completing the work.) And there are other, less scientific ways to predict mood that may be used: for example, horoscopes, biorhythms, and analysis of the language used in e-mails sent by the user.

This information may be presented in many ways. Although FIG. 4 shows the team member's location in avatars 405 and 410 using a simple text listing (in text), the avatar might include a projection of the earth, with the team member's location at the center of the projection. The team member's availability (i.e., whether the user is currently at work) may be indicated by having the avatar displayed in ordinary color versus being grayed out (the latter indicating that the team member is not currently available). And while the mood indicator described above is described as iconic, the avatar could also present the user's mood textually. The avatars (and, indeed, all components of the project space) may be responsive to events, so that, for example, the passage of the mouse over an avatar may change the information displayed in the avatar. A person skilled in the art will recognize other ways in which avatar information may be presented to team members.

Although the term "avatar" has been used above, it should be understood that the avatars used to represent users are different from the standard concept of "avatar" as used for on-line gaming. In some forms of on-line gaming, an avatar is present only when the player is connected to the game, to let others know about the player's presence. In other forms of on-line gaming, the avatar is present only when the player is absent, so that the avatar may act as an agent on behalf of the (absent) player. The two models of on-line gaming avatars do not coexist: that is, avatars are not used to both represent the player's presence and to act-as an agent in the player's absence. In contrast, the avatars of an embodiment of the invention represent the user at all times, even when absent, but do not act as an agent for the user when he or she is absent.

Figure 5:
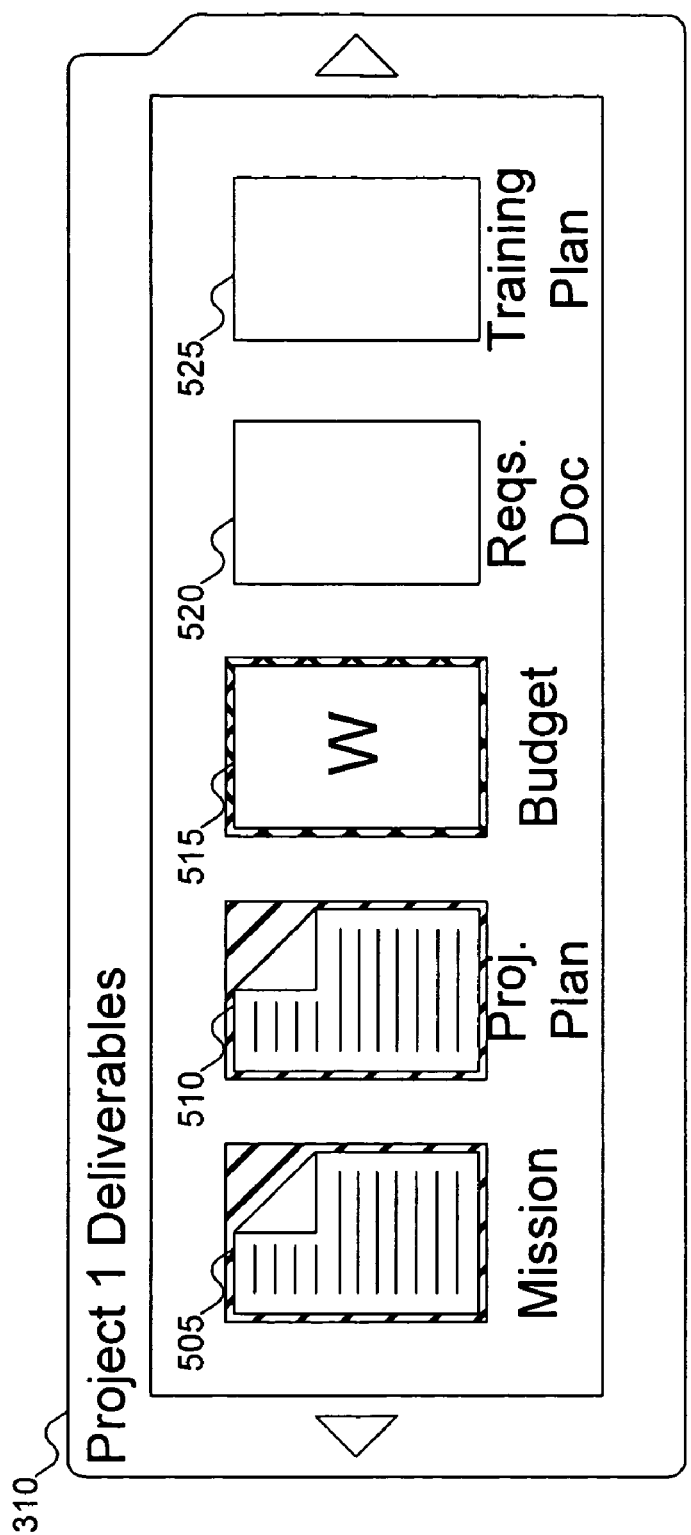
FIG. 5 shows details of a deliverable list for a project in the collaborative workspace of FIG. 3, according to an embodiment of the invention.

As documents are completed and ready to be delivered according to the project, they are placed in a deliverables drop 310, shown in FIG. 5. The deliverables drop includes a place for each document to be delivered according to the project. FIG. 5 shows deliverables drop 310 with five document deliverables. Documents 505 and 510 have already been placed in deliverables drop 310; documents 515, 520, and 525 remain to be completed. Obviously, different projects will have different deliverables, in terms of both numbers of documents and their types. For example, one project might include three Microsoft Word documents, whereas another project might include one Microsoft Excel document. If the types of documents are known in advance, the particular locations within the deliverables drop for each document may be templated, so that only a document of the correct type is placed in that drop. Templating deliverable drops may help ensure that the correct file is placed in the correct slot. For example, a template indicates that document 515 is a Microsoft Word document: if any other type of document is placed in that slot, the project space may alert the user to the fact that the wrong document type was placed in deliverables drop 310.

The deliverables drop may be color-coded, to make it easy for team members to see what has been completed and what remains to be completed. For example, deliverables that have been placed in the deliverables drop 310, such as documents 505 and 510, may be colored green (represented in FIG. 5 with a diagonal fill pattern), to indicate that the deliverables have been completed, whereas deliverables that have yet to be placed in the deliverables drop may be colored red, to indicate the need to complete the documents. Alternatively, red may be reserved for documents that are behind schedule, with some other color (or no color at all) used to indicate documents that have yet to be delivered but are not yet due. In FIG. 5, document 515 is behind schedule, and colored red, represented by the crosshatch fill pattern. Documents 520 and 525, although not yet in deliverables drop 310, are not yet due, and are not colored. A person skilled in the art will recognize other color schemes that may be used to facilitate document identification as well as monitoring associated actions, if any.

This color-coding makes it easy for users to quickly find out the status of any deliverables. For example, suppose that one team member is responsible for preparing a requirements document for the project, but another team member is responsible for the actual development of the product. The product may not (in theory) be developed until after the requirements are determined. So, the team member responsible for development waits until he or she sees that the requirements document has been added to the deliverables drop. This lets the development team member know that the requirements are "finalized," and that he or she may proceed with development. In addition, since presumably the development team member would have been checking the deliverables drop regularly, if the requirements document were late being added to the deliverables drop, the fact that the requirements document had been added to the deliverables drop would give the development team member incentive to begin development: he or she could delay no longer.

The documents in the deliverables drop may also be linked. For example, suppose that the time has passed to complete the development of the product, but the requirements document remains unfinished. Since the product may not be developed (in theory) until the requirements are defined, it accomplishes little to let everyone know that the development document is overdue (except, perhaps, to further motivate the team member responsible for the requirements document). Thus, the development document, even though overdue, might not be color-coded as overdue, as it depends on the as-yet-incomplete requirements document.

Figure 6:
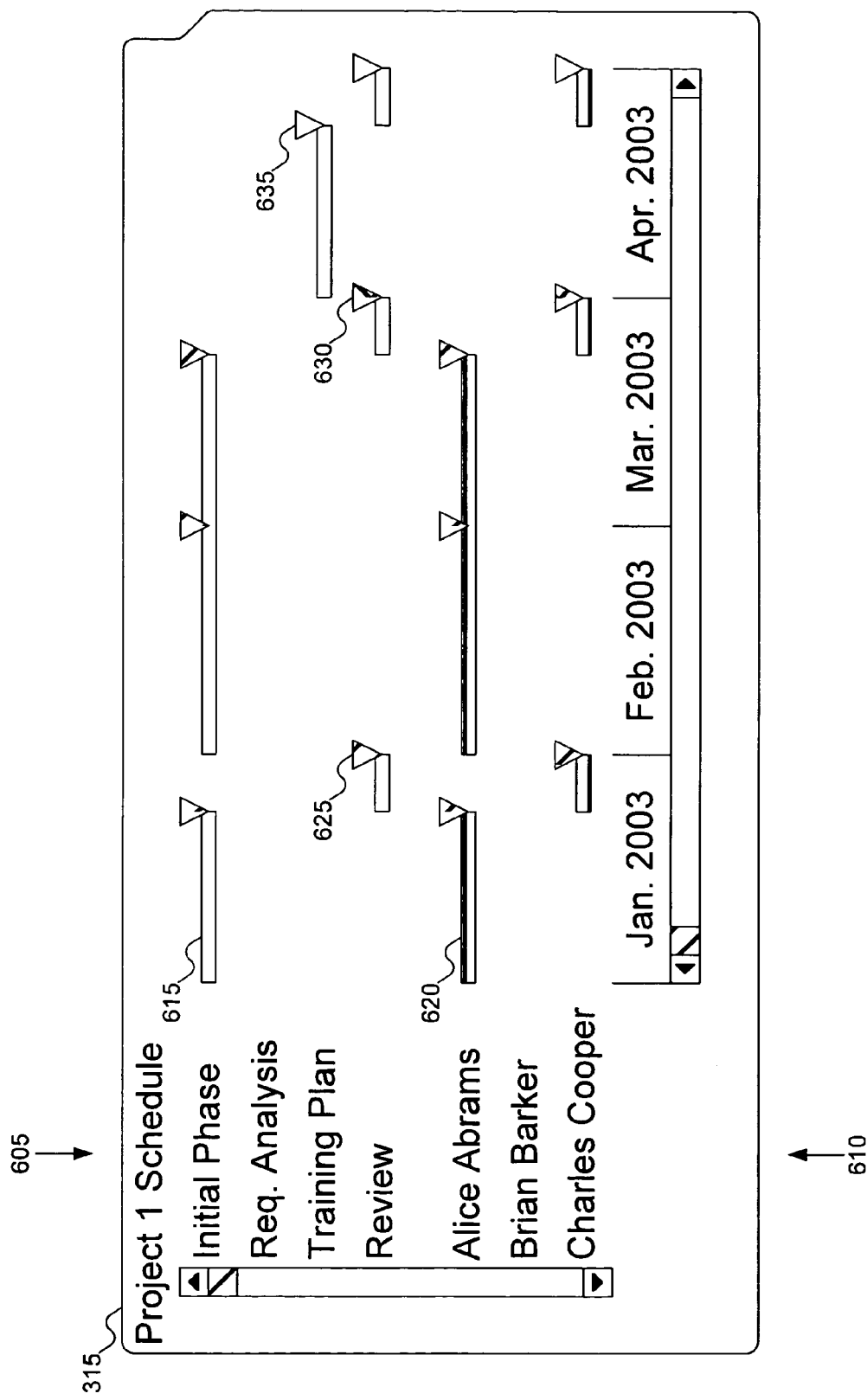
FIG. 6 shows details of a project schedule in the collaborative workspace of FIG. 3, according to an embodiment of the invention.

The team schedule, shown in greater detail in FIG. 6, as suggested by the name, provides a schedule for the team. Information in the team schedule may be organized in several different ways. The first, and most intuitive way, is to show each team member's schedule as it relates to the project. (That individual users might be involved in multiple projects, and therefore not available during times not scheduled for the project, is discussed below.) For each team member, the time (s) he or she has worked and will work on the project are shown. This information may also be marked to identify work status: that is, work that has been completed and work that is pending. Additional work status information may include work that is urgent versus work that is low-priority (or even, perhaps, optional). In addition, the work may be divided into different types of work: for example, meetings, travel, and "real" work. In a typical embodiment of the invention, color codes may be used to identify the different types of work and the status of the work, similar to the color codes used for the deliverables drop, as described above.

As an alternative, or as a supplement, to team member's schedules, the team schedule may also display the state of different work phases. For example, there may be an initial stage, a requirements analysis phase, a development phase, and a testing phase. Each phase may be assigned different time periods on the schedule, according to the projected schedule for the project. Work phase schedules, like the schedules of individual users, may be color-coded.

Schedule 315 of FIG. 6 shows both of these alternatives. Phases 605 show the various phases of work, and names 610 identifies the particular team members, along with the intervals when they are working on the project. Shading, as an alternative to color, in FIG. 6 represents different types of activities occurring in schedule 315. For example, interval 615 represents a time span spent on a particular phase of work, whereas interval 620 (with different shading) represents a period when a team member (in this case, Alice Abrams) is actually working.

Schedule 315 also reflects action items. As discussed above with reference to FIG. 5, color may be used to differentiate completed, overdue, and future action items. For example, action item 625 is completed, action item 630 is overdue, and action item 635 is due in the future.

Figure 7:
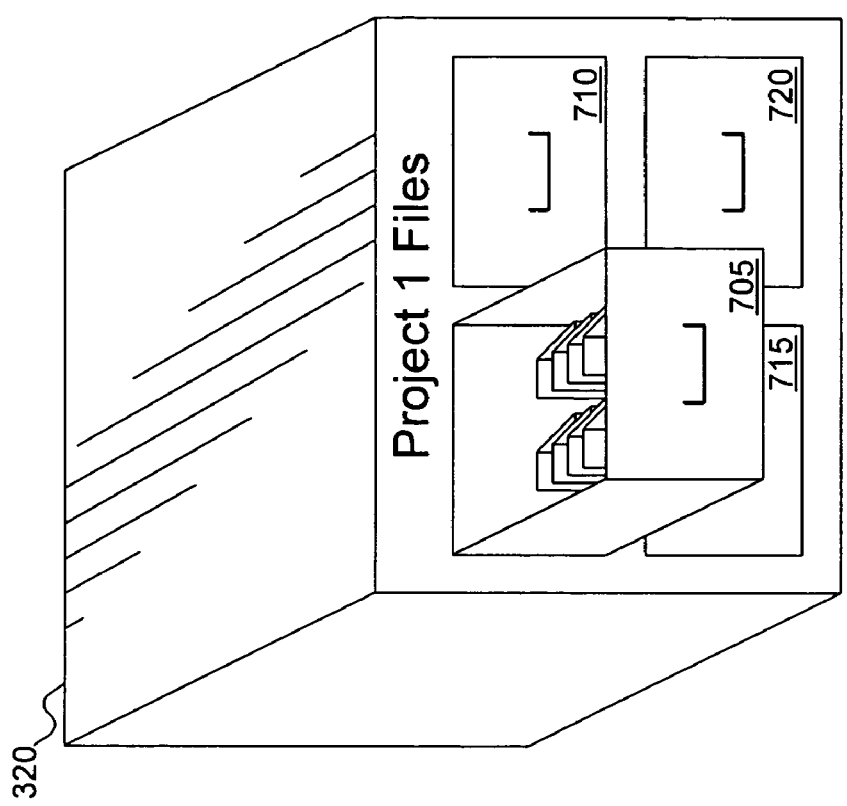
FIG. 7 shows details of a data repository in the collaborative workspace of FIG. 3, according to an embodiment of the invention.

The data repository 320, shown in detail in FIG. 7, acts as a central location where documents may be stored when not actively needed. For example, if the project has passed the requirements analysis phase and has begun development, the requirements analysis document may be stored in the data repository 320. Of course, if the requirements analysis needs to change to reflect a reality not anticipated before development, the document may be retrieved from the data repository 320, edited, and then returned to the data repository 320. (If needed, the document may also be retrieved from the deliverables drop, so that the deliverables drop includes the most current version of the document. In a typical embodiment of the invention, the document in the deliverables drop is linked to the document in the data repository 320, so that changes made to either document are automatically reflected in the other.) The data repository 320 may be represented as having different "drawers," such as drawers 705, 710, 715, and 720, each drawer acting like a folder.

Figure 8:
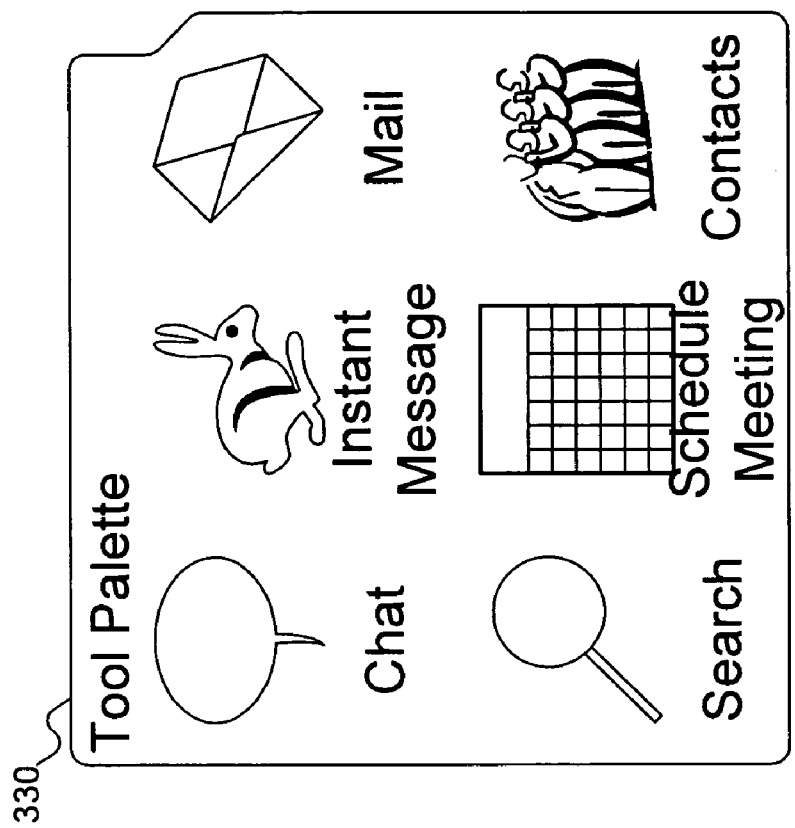
FIG. 8 shows details of a tool palette in the collaborative workspace of FIG. 3, according to an embodiment of the invention.

The tool palette 330, as the name implies, is a set of tools that may be used by the team members. Shown in greater detail in FIG. 8, the tool palette may include tool such as a chat or instant messaging tool, an e-mail tool, a search tool, a meeting scheduling tool, and a contacts list. Each of these tools acts generally as the name implies, although the search tool does more than search just documents. For example, the search tool may enable team members to search for other users (which causes the located user's avatar to appear in the project space), or to search within playbacks of document changes from the meeting room for what changes were made by particular users (which lists documents changed by the desired user). And the meeting scheduling tool lists all currently scheduled meetings, so that the user may view details about the meetings, and allows the user to schedule a new meeting. These tools may be implemented as an Application Program Interface (API), which provides users with access to the tools and allows for a way to modify the tool set (allowing for new combinations as new tools are added).

Figure 9:
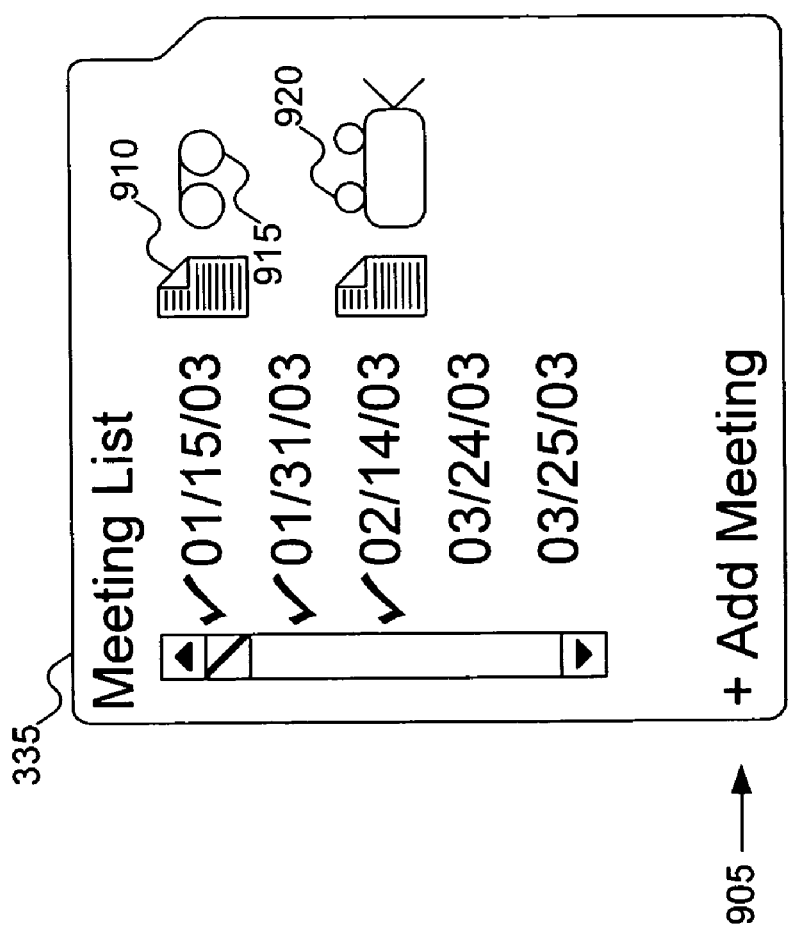
FIG. 9 shows details of a meeting list in the collaborative workspace of FIG. 3, according to an embodiment of the invention.

Because meetings are typically a regular occurrence, the meeting scheduling tool may include a meeting list 335, shown in FIG. 9. The meeting list 335 shows all currently scheduled meetings and provides a link 905 to the meeting scheduling tool. The meeting list 335 may be displayed in the project space as another component of the project space. Completed meetings are indicated in FIG. 9 with a check mark, and other symbols are used to represent important points. For example, document icon 910 indicates that a document is attached to the meeting, tape icon 915 indicates there is an audio presentation, and video icon 920 indicates there is a video presentation. Selecting these icons may open the related document, presentation, etc.

Figure 10:
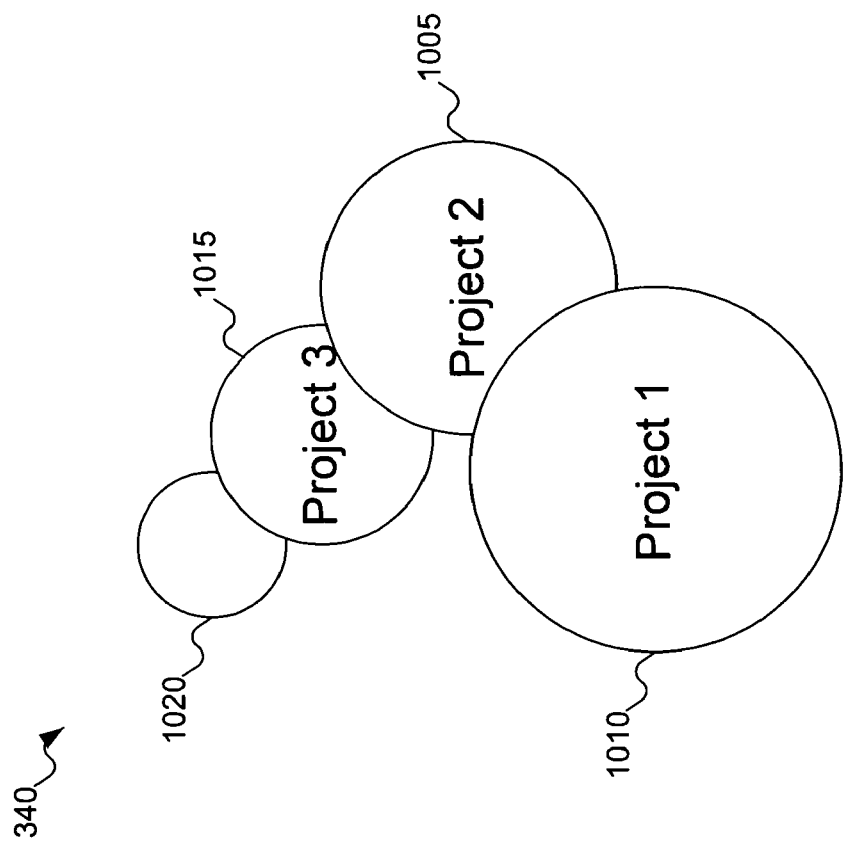
FIG. 10 shows details of links to other projects in the collaborative workspace of FIG. 3, according to an embodiment of the invention.

Another feature of the project space is the inclusion of links to other projects. FIG. 10 shows more detail about links 340. Rather than limiting the user's view to the current project, the project space lets users keep an eye on other projects as well. For example, an individual user might be involved in several projects at one time. Although the user might be working on one project, he or she might be interested in knowing about things happening on other projects. When something important happens in one of the other projects in the background of the project space, the user may be alerted to this fact. For example, the link 1005 to the other project may flash briefly on screen to catch the user's attention, then a pop-up may inform the user about what has happened.

The links to other projects also provides a quick way for users to switch between projects (i.e., to exchange which project is in the foreground). Rather than closing out the currently open project and then finding and opening another project, the user may simply select the link to the other project. This one act simultaneously moves the current project into the background, and brings the selected project to the foreground.

Although shown in FIG. 3 to be part of the project space, a person skilled in the art will recognize these links 340 depend on the individual team member viewing the project space. Since each team member sees links to other projects of which they are members, and not other projects, each team member sees different links 340, even within the project space.

In FIG. 10, four links are shown. Link 1010 identifies the open project. Links 1005 and 1015 identify background projects. Link 1020 is currently unassigned. A person skilled in the art will recognize that there may be fewer or more than four links, and that they may be used, left blank, hidden, etc. as desired by the user.

In contrast to the data repository, the meeting room shown in FIGS. 11A-11E acts as a place where documents in active use are stored. The team members, all of whom have access to the meeting room, may all access and change the documents in the meeting room at any time. Documents in the meeting room are persistent: that is, as users enter and leave the meeting room the documents remain, capturing work as it progresses.

On feature of the meeting room is the presentation of all recent changes to documents. At a command, the meeting room may play back changes as a document progressed from an earlier state to the current state. This playback may show not only the actual changes made to the document (such as insertions and deletions of text, insertions and deletions of graphics, and annotations), but also which user was responsible for each change, and from which locations and at what times the changes were made. This playback enables users to see the complete progression of the document, and gives them some feel for what the other team members are thinking, since the changes may be traced back to the individual users that made the changes.

For example, a user may press ore of buttons 1105 to move forward or backward through time in showing changes in the meeting room. At the start (in FIG. 11A), the meeting room shows only document 1110. The first change (in FIG. 11B) is that team member Alice added picture 1115 to document 1110. Information about the change, such as the name of the user and the date and time of the change, are shown in information box 1120. In addition, the user's avatar 1125 may also flash, to give the user a graphical indication of who was responsible for the change.

Figure 11A:
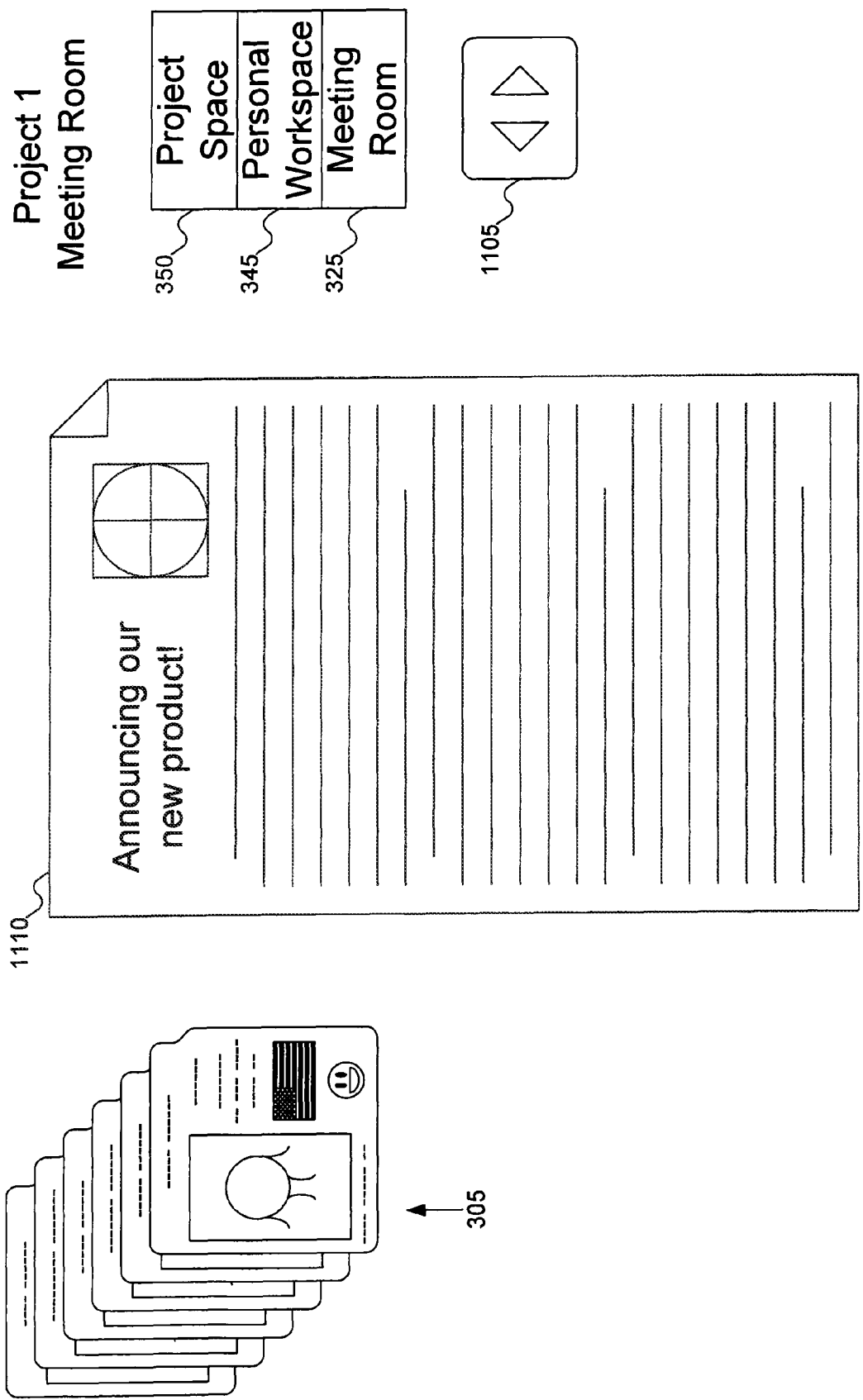
FIGS. 11A-11E show a meeting room as used in the systems of FIGS. 1A-1C, according to an embodiment of the invention.
Figure 11B:
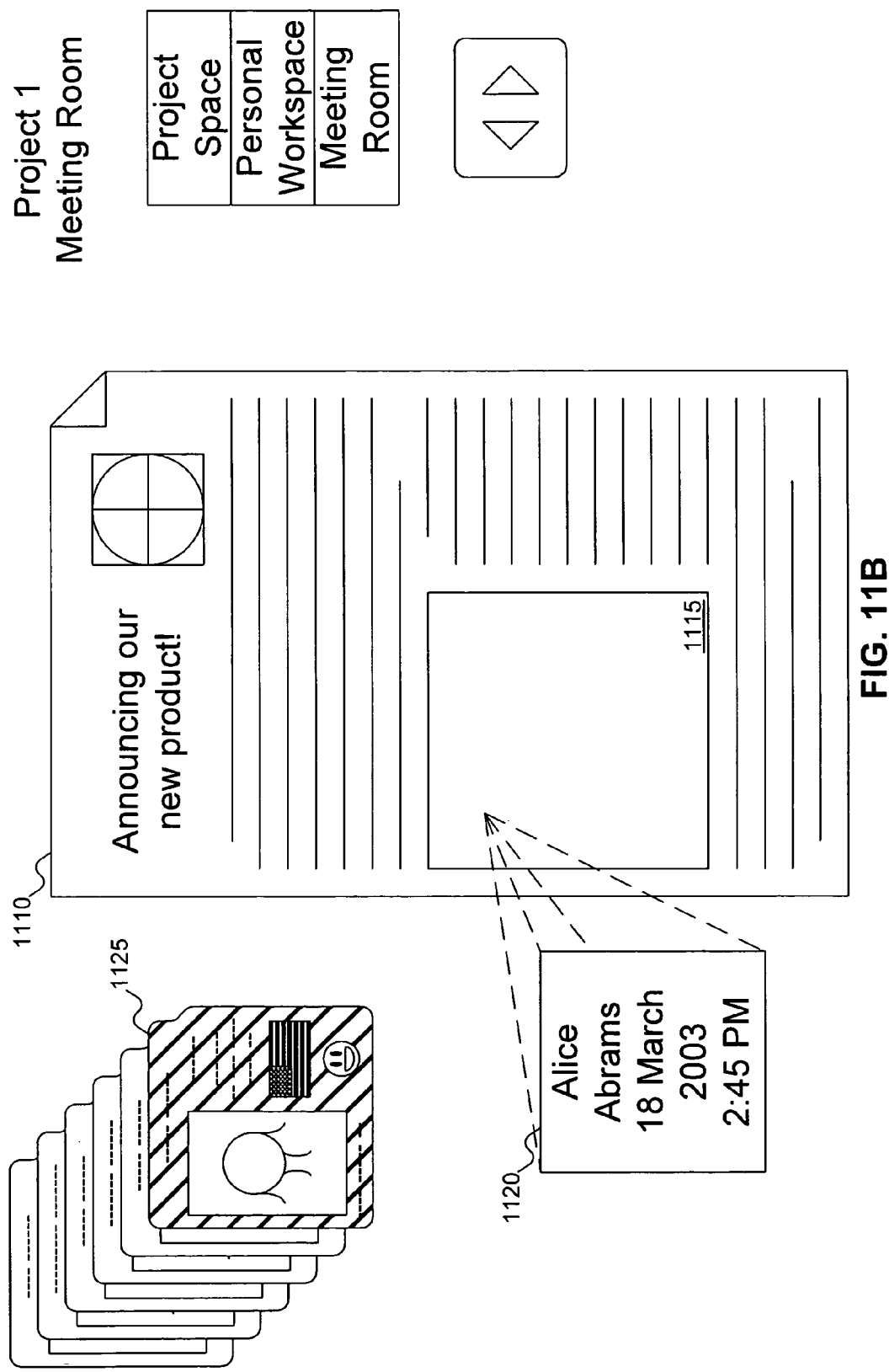
Figure 11C:
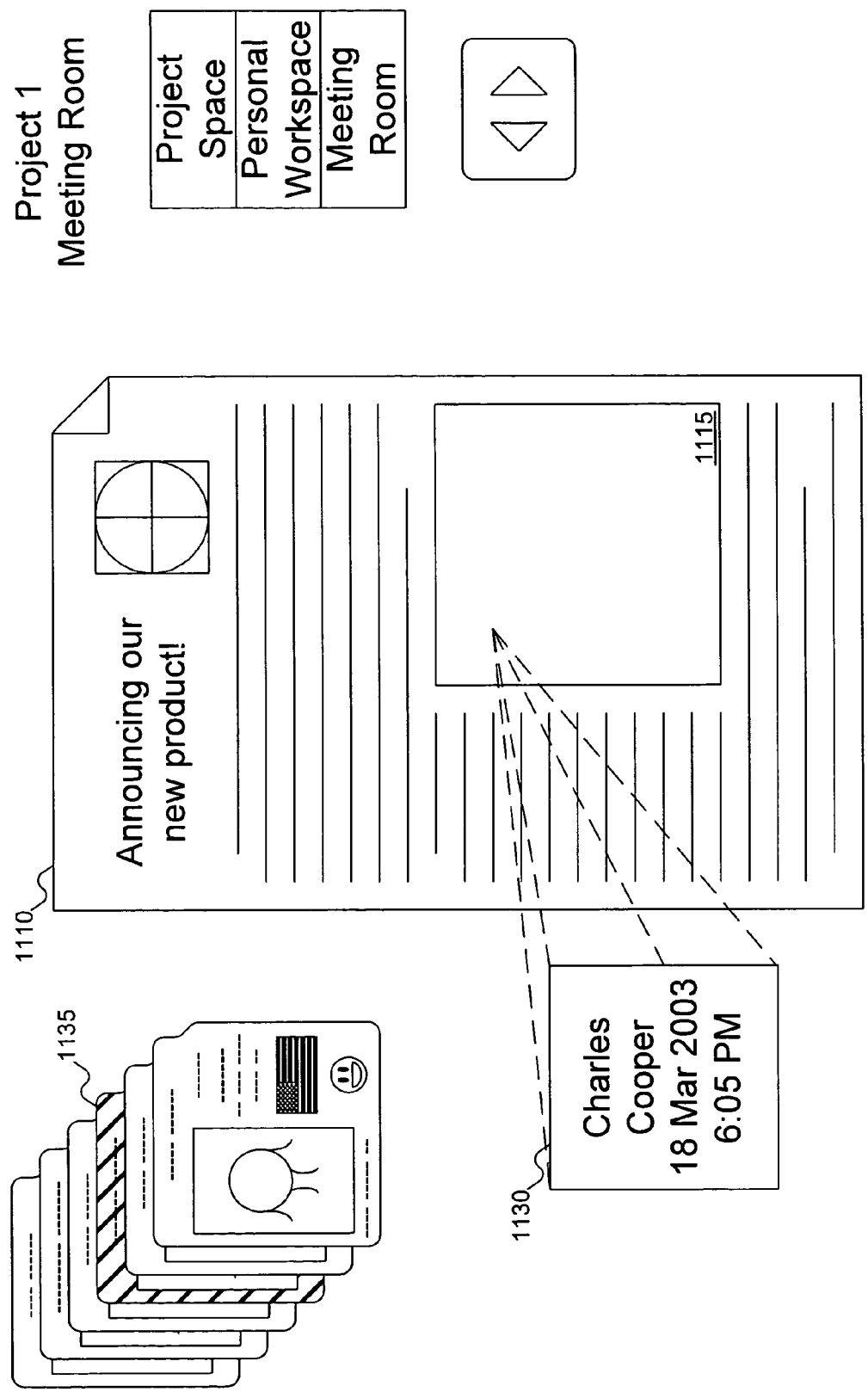
Figure 11D:
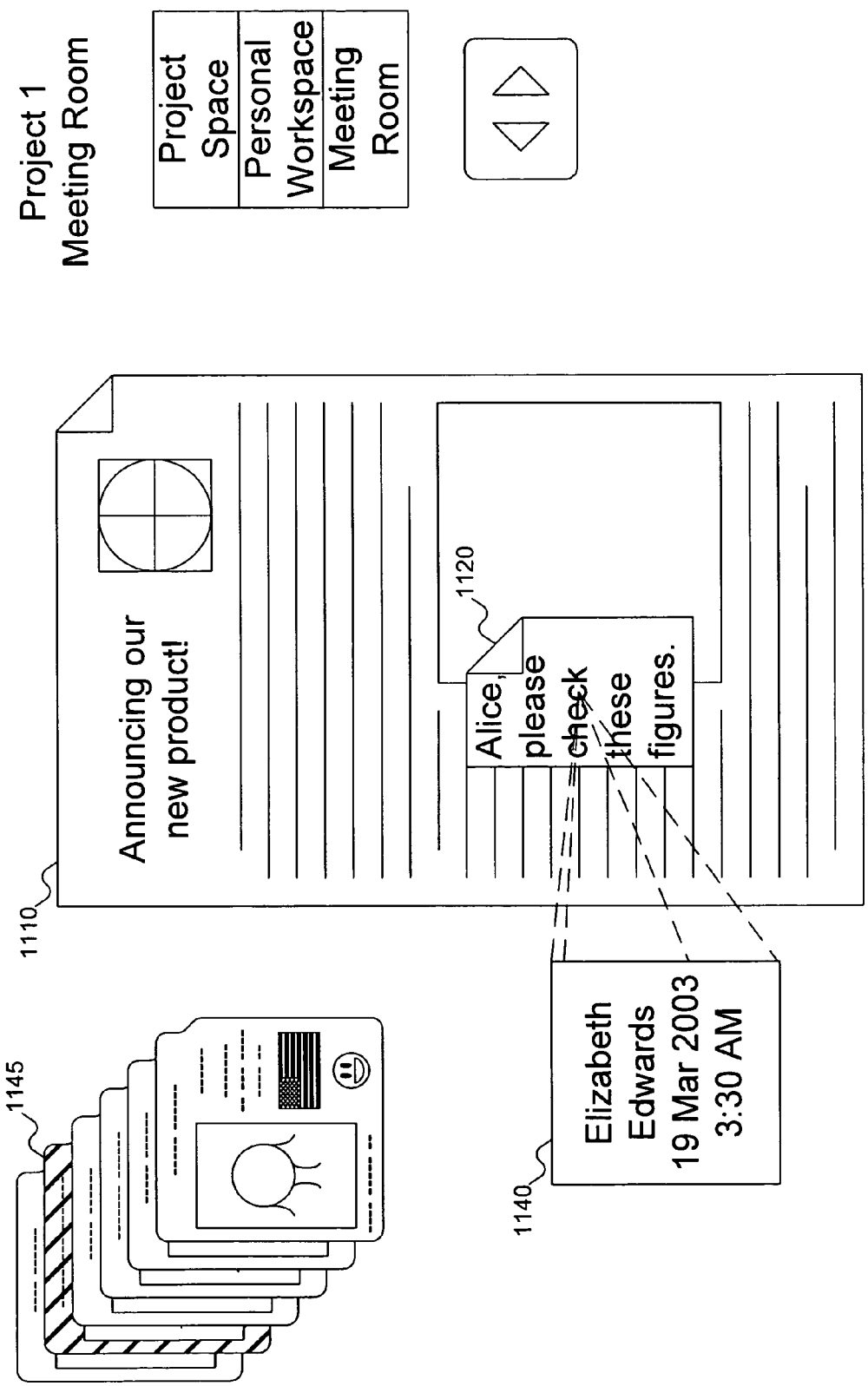
Figure 11E:
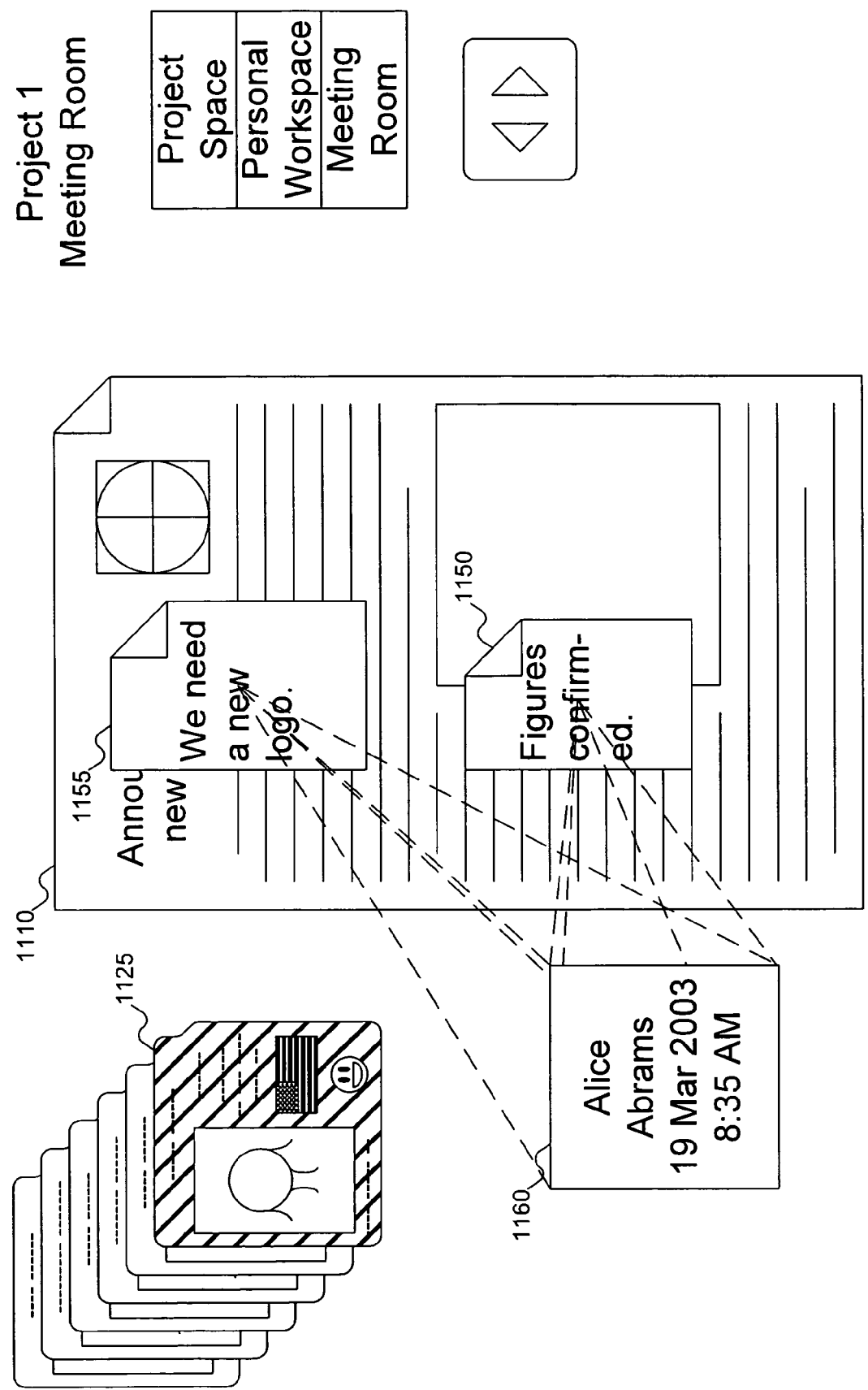

In FIG. 11C, Charles Cooper moves picture 1115 to the other side of the page. Information box 1130 shows the date and time of the change (which may be local to the viewing user), and avatar 1135 flashes. In FIG. 11D, Elizabeth Edwards drops note 120 onto the document. The date and time of the change are shown in information box 1140, and avatar 1145 flashes. Finally, in FIG. 11E, Alice updates responds with note 1150, and adds another note 1155. Information box 1160 indicates the date and time, an avatar 1125 flashes.

Another feature of the meeting room is the ability to post "action required" messages to other users. For example, a user may drag a document from the meeting room onto a user's avatar. This lets the selected user know that they need to act on the document. This information may be sent to the user immediately (if the user is currently using the system), or may be saved until the user next accesses the system (as a long in message). (Dragging of a document onto the avatar posts an "action required" message using object-oriented technology, as described below.)

As should be apparent to one skilled in the art, the idea of dragging and dropping documents may be generalized beyond the use described above within the meeting room. For example, a user may create a document on his or her personal computer, and drag that document into the meeting room. This adds the document to the data repository and places the document in the meeting room, so that other team members may view the document and update it, if desired.

The meeting room provides for the possibility of asynchronous meetings. As discussed earlier, team members may be scattered all around the world. Scheduling a meeting at a time that is convenient to some users may be inconvenient to other users. Instead of scheduling synchronous meetings (that is, meetings that all team members attend), the meeting room supports the possibility of asynchronous meetings. Users that may attend the meeting at its scheduled time do so. Other users attend at a time that is convenient to them, even if not coincident in time with other users. The meeting is not closed until all users have made their contributions to the meeting.

As an example, a meeting may be scheduled for 9:00 AM-10:00 AM PDT. All users that are available attend the meeting via the meeting room at that time. The meeting room captures the various contributions of the available team members. Then, team members in other time zones, that were not able to attend the meeting at its scheduled time, review the comments and contributions of the attendees and add their own thoughts. Eventually, all team members will have made their contributions to the meeting, at which time the meeting may be closed.

Typically, the team members that are unable to "attend" the meeting at its scheduled time do so at their earliest opportunity. This means that meetings may be closed after approximately 24 hours under typical circumstances. But under unusual circumstances (e.g., meetings on Friday, or before holidays observed by some team member), meetings may be kept open for longer, until all team members have had a chance to contribute.

Figure 12:
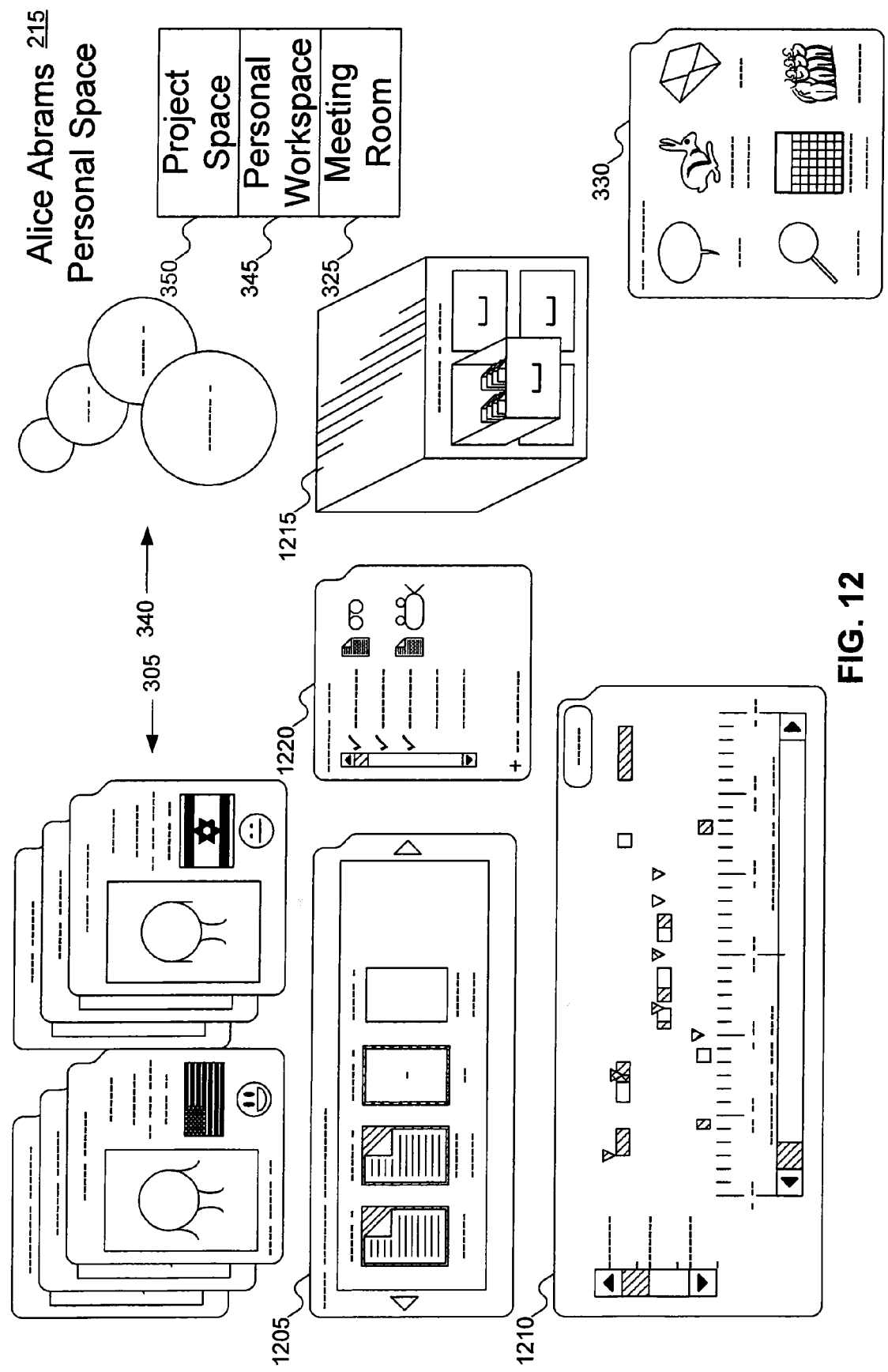
FIG. 12 shows a personal workspace as used in the systems of FIGS. 1A-1C, according to an embodiment of the invention.

Another embodiment of the invention is the personal workspace, shown in FIG. 12. The personal workspace 215 is similar to the project space, including a similar feature set. The difference is that, whereas the project space presents information about a project (and all of the project's team members), the personal workspace presents information about the user, across all of his or her projects. For example, the avatars 305 shown might identify other users with whom the user has personal relationships. The deliverables drop 1205 shows all deliverables for which the user has responsibility. The individual schedule 1210 shows the schedule for the user across all of his or her projects. Rolling-up the schedule shows a timeline of the user's planned activities across all projects. The data repository 1215 provides access to all files on which the user works. The meeting list 1220 shows all meetings (across all projects) of which the user is a participant. A person skilled in the art will recognize other ways in which the personal workspace differs from the project space.

Figure 13:
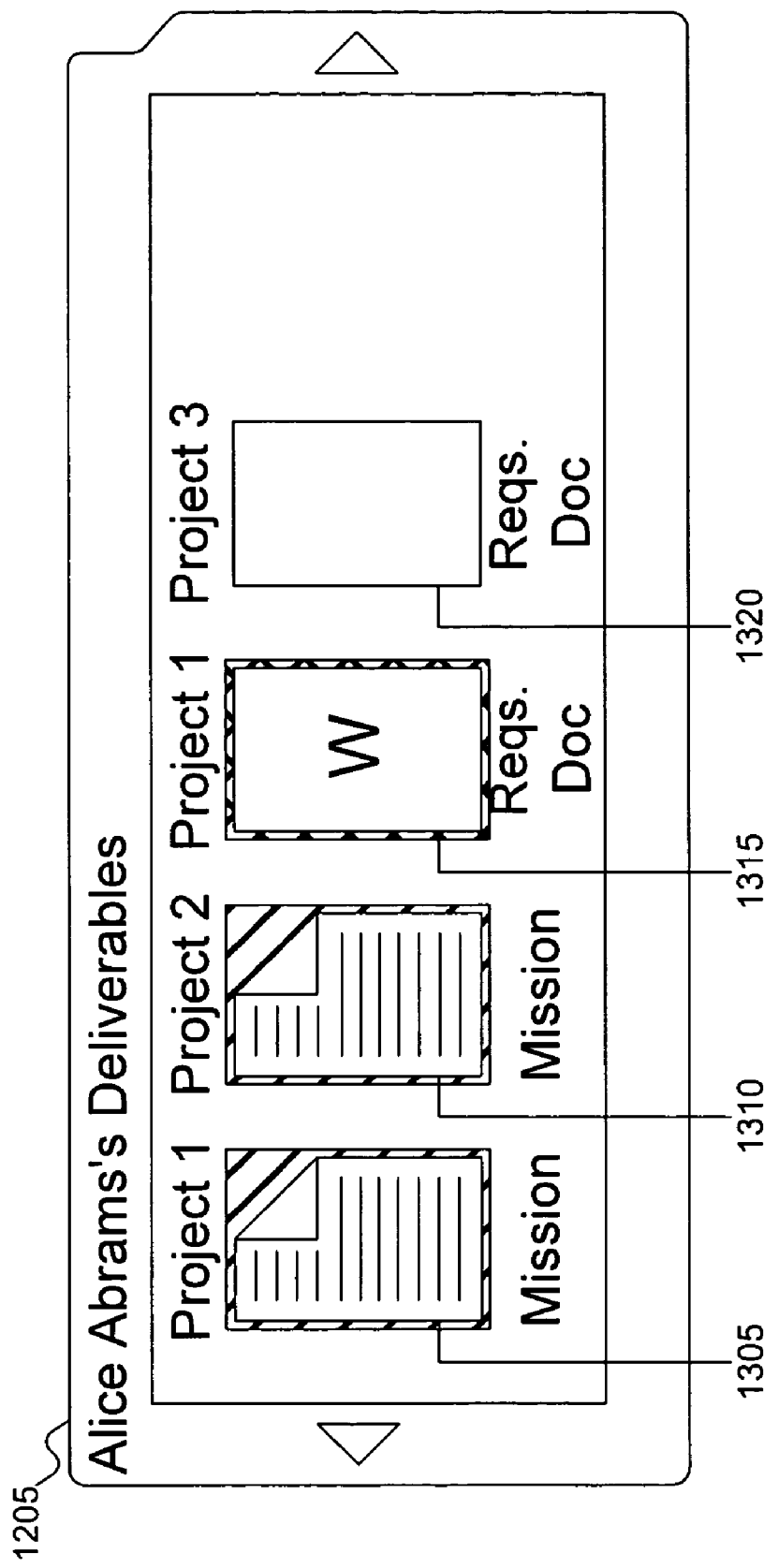
FIG. 13 shows details of a personal deliverable list in the personal workspace of FIG. 12, according to an embodiment of the invention.

FIG. 13 the personal workspace deliverables drop 1205 in greater detail. Similar to the project deliverables drop discussed above with reference to FIG. 5, the personal deliverables drop 1205 includes places for deliverables for various projects for which the team member is responsible. Thus, documents 1305 and 1310 have been delivered, document 1315 (with a template indicating document 1315 is a Microsoft Word document) is overdue, and document 1320 has not yet come due.

Figure 14A:
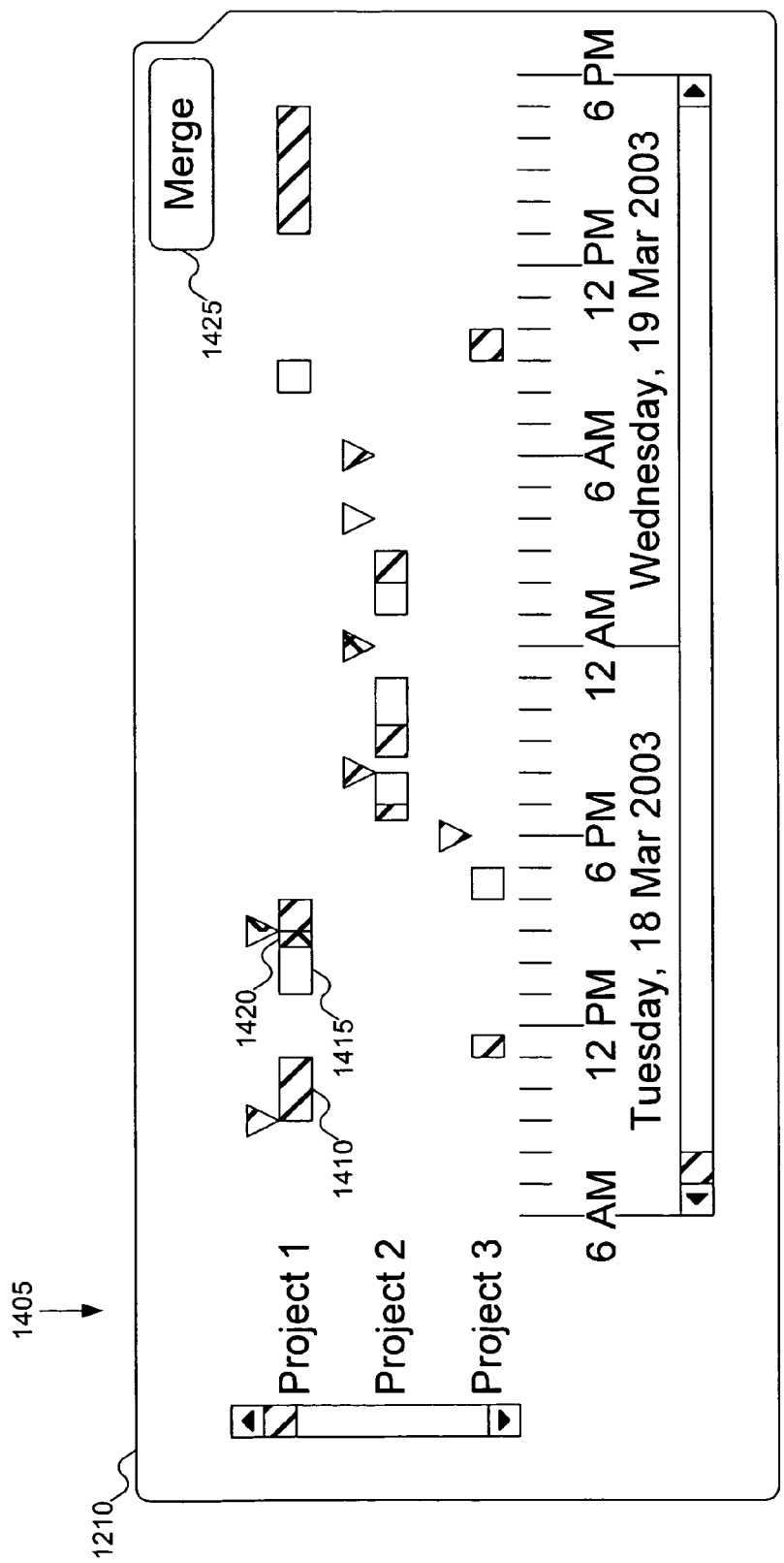
FIG. 14A shows details of a personal schedule in the personal workspace of FIG. 12, according to an embodiment of the invention.

FIG. 14A shows the user's schedule 1210 split across three projects 1405. As with the project schedule discussed above with reference to FIG. 6, color or shading may be used to represent different activities. For example, the shading for block 1410 may indicate a scheduled meeting, the shading for block 1415 may indicate work (other than a meeting), and the shading for block 1420 may indicate a period of time spent traveling.

Figure 14B:
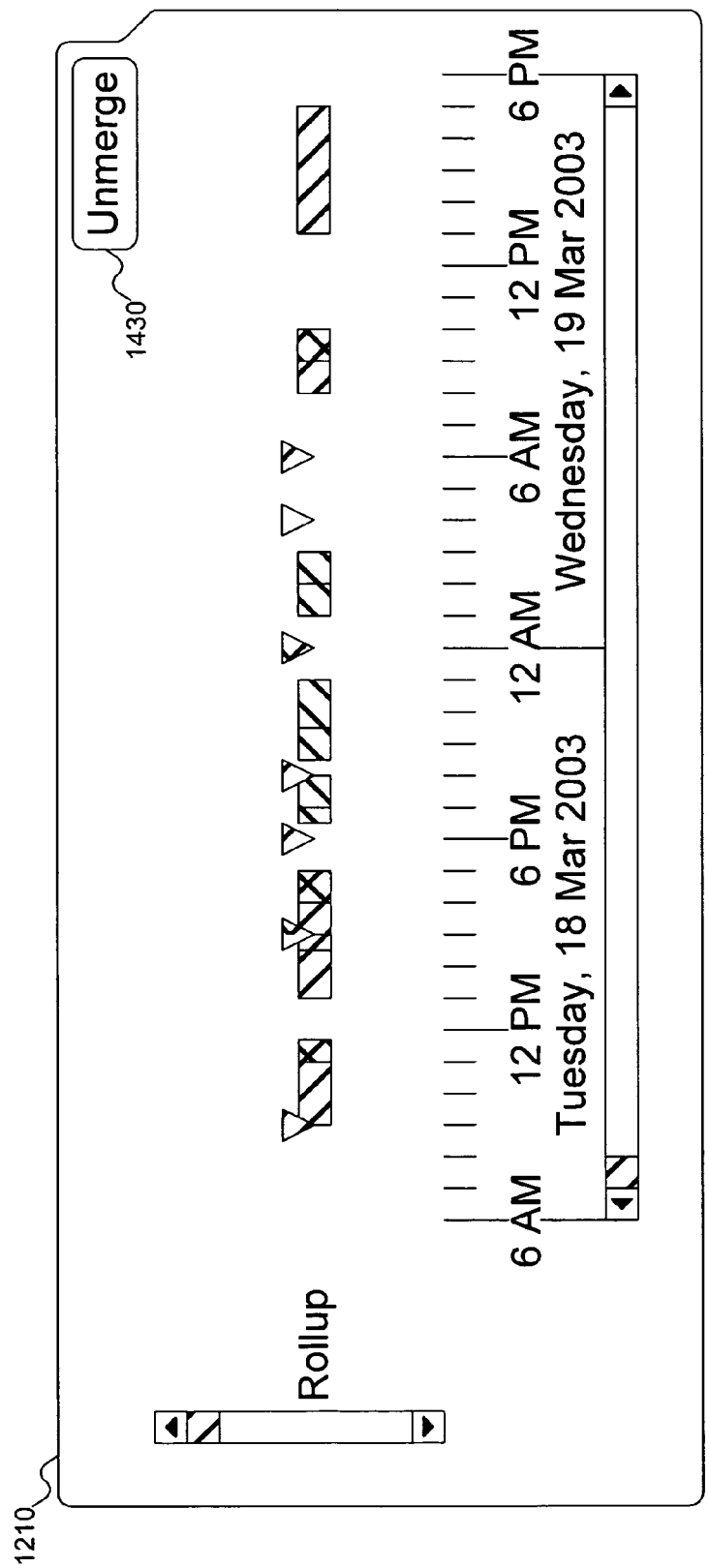
FIG. 14B shows the personal schedule of FIG. 14A rolled up, according to an embodiment of the invention.

Merge button 1425 causes schedule 1210 to roll up. After being selected, the schedule looks as shown in FIG. 14B. The three schedules are combined into a single schedule, showing the user's complete schedule in a consolidated view. The user may also select unmerge button 1430, to revert back to the original three-project schedule view.

In an embodiment of the invention, the various components of the project space and personal space are implemented using an object-oriented structure. That is, the components displayed in the project space are instances of objects. (Although every effort has been made to carefully distinguish between objects and object instances in this discussion, it should be clear from context which term is intended, in case the word "instance" is unintentionally omitted.) For example, there is a user object, which is defined to represent the avatar. When a particular user is to be displayed in the project space, an instance of the user object is created. The instance is then populated with the appropriate data for the user, and the instance is added to the project space.

One reason for using objects is that objects include properties and methods. Properties are fields that store data. Methods are functions and/or procedures that operate on the properties of the object instance. By virtue of their invocation, a method implicitly operates on the properties of the instance to which the invoked method is attached.

The project space is constructed to allow users to connect any two (or conceivably more) object instances, causing the instances to interact. This connection is typically accomplished by dragging the instance of one object onto the instance of the second object. For example, the user may drag an avatar instance onto the e-mail tool instance. Behind the scenes, what happens is that a method associated with the e-mail tool instance is invoked, and receives as a parameter the instance of the avatar. By identifying the avatar that is passed as a parameter to the method of the e-mail tool instance, the project space determines that the user desired to send an e-mail message to the selected user. The invoked method then creates a new e-mail message, and fills the new e-mail message with data from the avatar instance. The project space then displays the new e-mail message, addressed it to the selected user.

To achieve this operation requires the embodiment of the invention be tightly integrated. As indicated above, each object has properties. All values that may be easily predicted may be drawn directly from either (or both) of the selected objects, leaving the user to complete only the values that may not be predicted. For example, suppose the user selects to create a new meeting and drags that new meeting onto the team schedule. The project space may infer that the user wants to schedule a new team meeting. The meeting instance that is created may then include all team members, may access the individual schedules of all of the team members, and may present to the user a list, either textually or (preferably) graphically, of all available time slots for the meeting. All the user has to do is include a topic for the meeting, select an available time slot, and indicate the meeting's expected duration. Once done, the meeting is automatically added to the team schedule, and to the individual schedules of all team members.

The integration of the objects is part of the design of the architecture of the embodiments of the invention. Any objects added to the system have to integrate with all the other objects. By being tightly integrated, the objects are all capable of interacting with each other, simplifying user operation.

In addition, the integration may extend to software written by others, and software written for other hardware platforms. So long as the software being used is designed to integrate with other software (which means that interfaces and messages all conform to an agreed-upon format/design), integration is not limited to any particular software vendor or hardware architecture.

As a further example, suppose that the user wants to add a non-team member to the just-scheduled meeting. The user may locate the non-team member's avatar (perhaps using the search tool), and drags the avatar instance onto the newly defined meeting. This automatically adds the non-team member as a participant in the meeting, and incorporates the non-team member's schedule information to the meeting, so that the meeting may be scheduled at a time convenient to all participants.

A person skilled in the art will recognize that connecting object instances does not have to be limited to one-way connections. That is, instead of the user dragging an avatar instance to the e-mail tool, the user might drag the e-mail tool onto the avatar instance. Reversing this connection accomplishes the same thing: it generates an e-mail to the other user. And the user may drag multiple object instances to another object instance, to generalize the concept. For example, the user might select and drag several avatar instances to the e-mail tool (to send an e-mail message to all of the selected users) or to the meeting scheduling tool (to schedule a meeting with a subset of the team members). But if the order of selection of object instances may have a different result, then the results of the commands would not be symmetric.

Figure 15A:
FIGS. 15A-15C show an embodiment of the invention as used in the systems of FIGS. 1A-1C propagating changes across projects and creating conflicts, according to an embodiment of the invention.
Figure 15A:
Figure 15A:
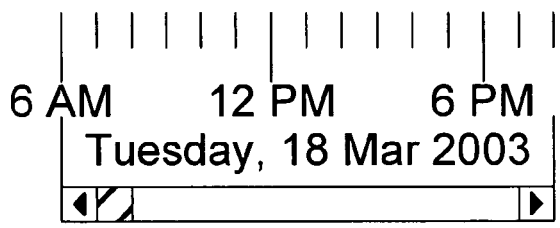
Figure 15A:
Figure 15A:
Figure 15A:
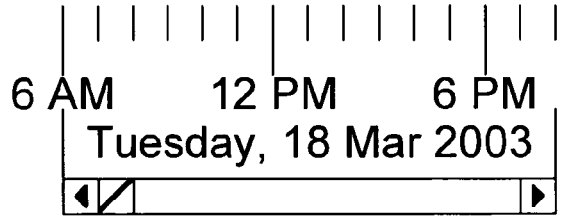

Another feature of the project space is the ability to propagate changes between projects. Consider the situation where there are two projects: project 1 and project 2. Project 1 involves two users: Alice and Brian. Project 2 also involves two users: Brian and Charles. (Note that Brian is common to both projects). This situation is shown in FIG. 15A: schedule 1505 is for project 1, and schedule 1510 is for project 2. Assume that all three users are at the same location, so that there are no concerns about differing time zones. Coincidentally, Alice and Charles are each trying to schedule project meetings (meetings requiring the attendance of all team members) for projects 1 and 2, respectively.

Figure 15B:
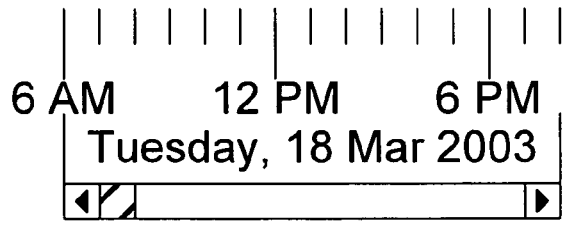
Figure 15B:
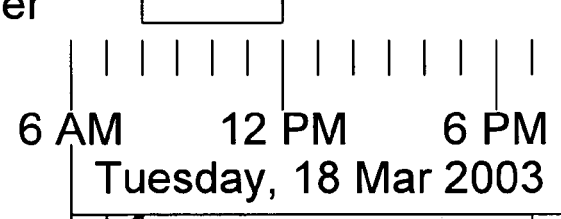

As shown in FIG. 15B, Charles happens to schedule a meeting 1515 for project 2 on Mar. 18, 2003, from 4:00 PM to 6:00 PM, as shown in schedule 1520. This obviously has the first effect of changing Brian's schedule, since he is no longer available on March 18 between 4:00 PM and 6:00 PM. But in addition, once the meeting for project 2 is scheduled, Brian is not available during that interval for the meeting for project 1. Thus, as soon as the meeting 1515 for project 2 is scheduled, Alice sees the change in Brian's availability on March 18, from 4:00 PM to 6:00 PM, in schedule 1525 (note the inclusion of block 1530).

To effect this propagation of changes, in one embodiment, the project space examines the change, and determines what the change impacts. In the situation described above, the change affects user schedules, but a person skilled in the art will recognize that other types of changes are possible. For example, as described above, a user's project space may alert the user when actions occur on background projects: in this case, the change is the action in the background project.

Returning to the explanation of how changes are propagated, once the project space knows what the change impacts, the affected objects are examined. If the affected objects are linked to yet further objects, the change is reported to the other objects. In this manner, a change may ripple through all projects, affecting objects that might otherwise be considered totally disconnected from the change.

Figure 15C:

It may happen that the change creates a conflict. For example, in FIG. 15C, Alice schedules the project meeting 1535 for project 1 on March 18, from 5:00 PM to 6:00 PM, as shown in schedule 1540. Obviously, this conflicts with the meeting for project 2. (Although Alice would know, from the team schedule, that Brian was not available at the time selected for the meeting, Alice might have selected the meeting time anyway, for lack of any non-conflicting alternative.) This conflict may be resolved in several different ways. For example, Brian may be notified of the scheduling conflict (perhaps with an urgent pop-up in his project space or personal workspace). Then, Brian may update the scheduling for the meeting for project 1 to a different time.

Figure 16:
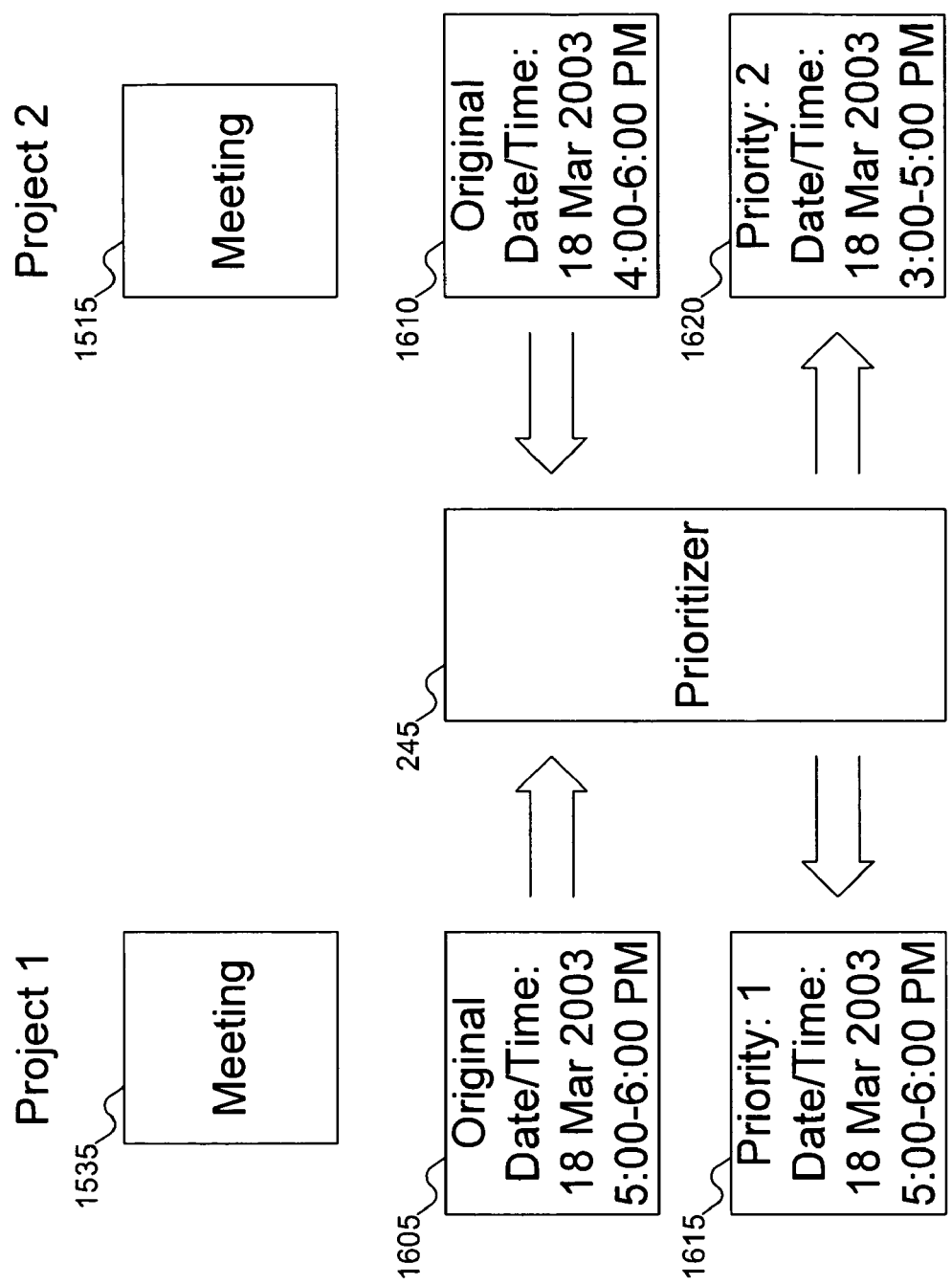
FIG. 16 shows an embodiment of the invention as used in the systems of FIGS. 1A-1C resolving conflicts by prioritization, according to an embodiment of the invention.

Another way to resolve the conflict is to assign priorities to projects. Assuming that project 1 has a higher priority than project 2, a prioritizer might automatically reschedule the meeting for project 2 to a different time, when all participants are available. For example, in FIG. 16, prioritizer 245 is shown taking information 1605 and 1610 about the conflict from each of the projects, and determining the priority of project 2's meeting 1515 to be lower than that of project 1's meeting 1535. Prioritizer 245 then changes the meeting time for project 2's meeting 1515 to one for which both participants are available but does not conflict with project's meeting 1535, as shown in rescheduled meetings 1615 and 1620. Or Charles (the user who scheduled the meeting in the first place) may be notified that Brian is no longer available at the scheduled time, and that Charles has to reschedule the meeting. (Of course, if project 1 has higher priority than project 2, the project space would probably not reschedule the meeting for project 2 automatically, but would force Charles to take some action to resolve the conflict: for example, to find another time for the meeting.)

Consider yet another example of an advantage offered by the integrated environment of embodiments of the invention. A user receives an e-mail, inviting him to join a project. If the user drags the e-mail into his personal workspace (discussed below), several things happen automatically. First, the user is added as a member of the team. This means that his schedule is added to the project space, the project is added to his personal workspace, and his avatar is added to the project space of other users, among other things. Any currently scheduled meetings are added to the user's schedule and any conflicts are highlighted (and potentially resolved automatically). Documents are added to his workspace, so that the user may review documents relating to the project. A person skilled in the art will recognize other consequences of the user accepting membership in the project.

One feature of described embodiments of the invention is that the project does not need to include a lead member. In the prior art, projects included someone who would have the responsibility of "motivating" the other team members. For this to work, either the lead member had to have more authority (either from his or her position within the business or superimposed for purposes of the lead member position). But having an individual be responsible for "encouraging" performance by others is a poor model. It is better for employees to be self-motivated. Embodiments of the invention encourage self-motivation. As team members see what other users have accomplished, the members are encouraged to pull their weight in the team. One user completing his or her work on time encourages other users to do the same.

Figure 17A:
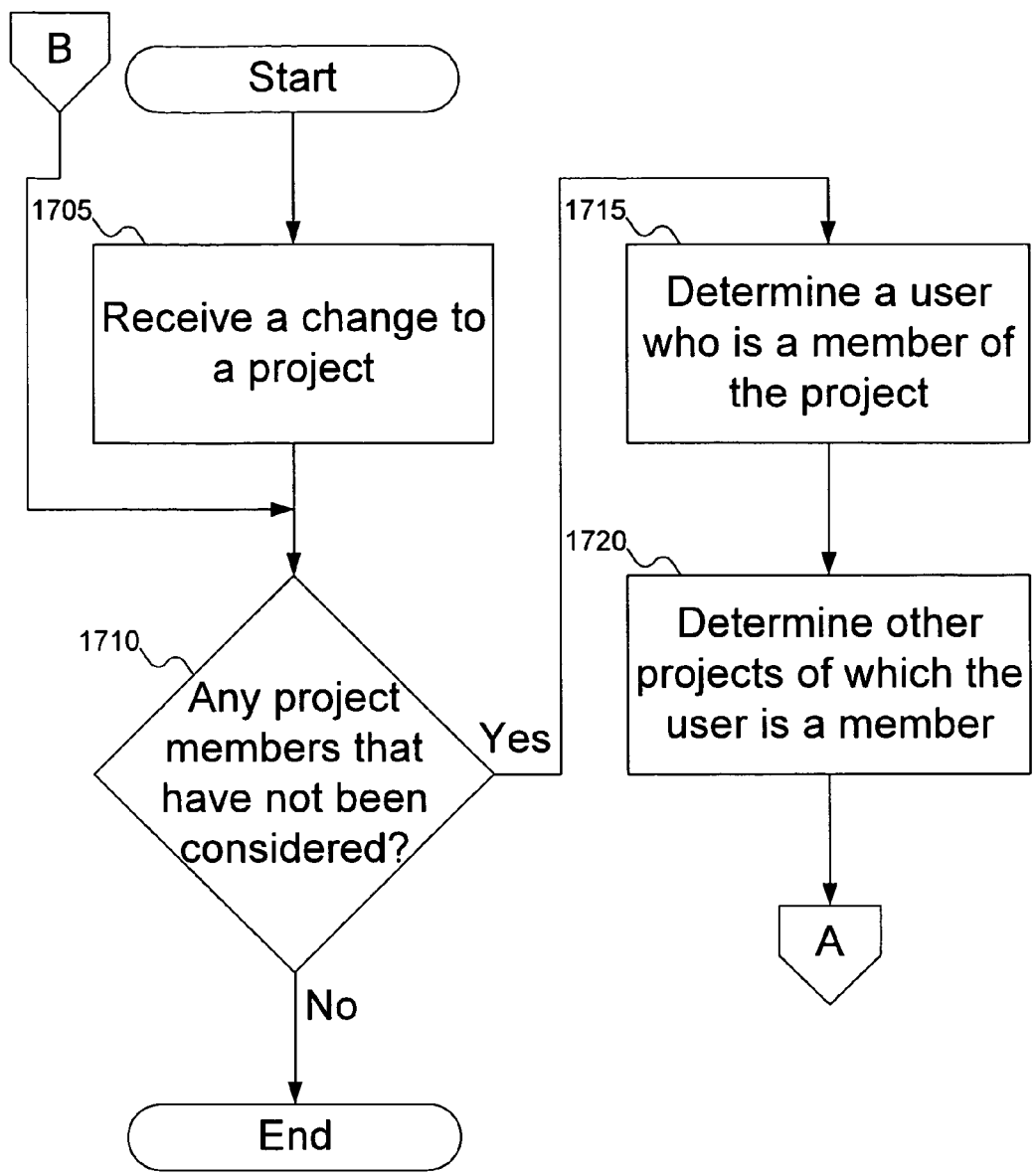
FIGS. 17A-17B show a flowchart of the procedure for propagating changes across projects in the systems of FIGS. 1A-1C, according to an embodiment of the invention.
Figure 17B:
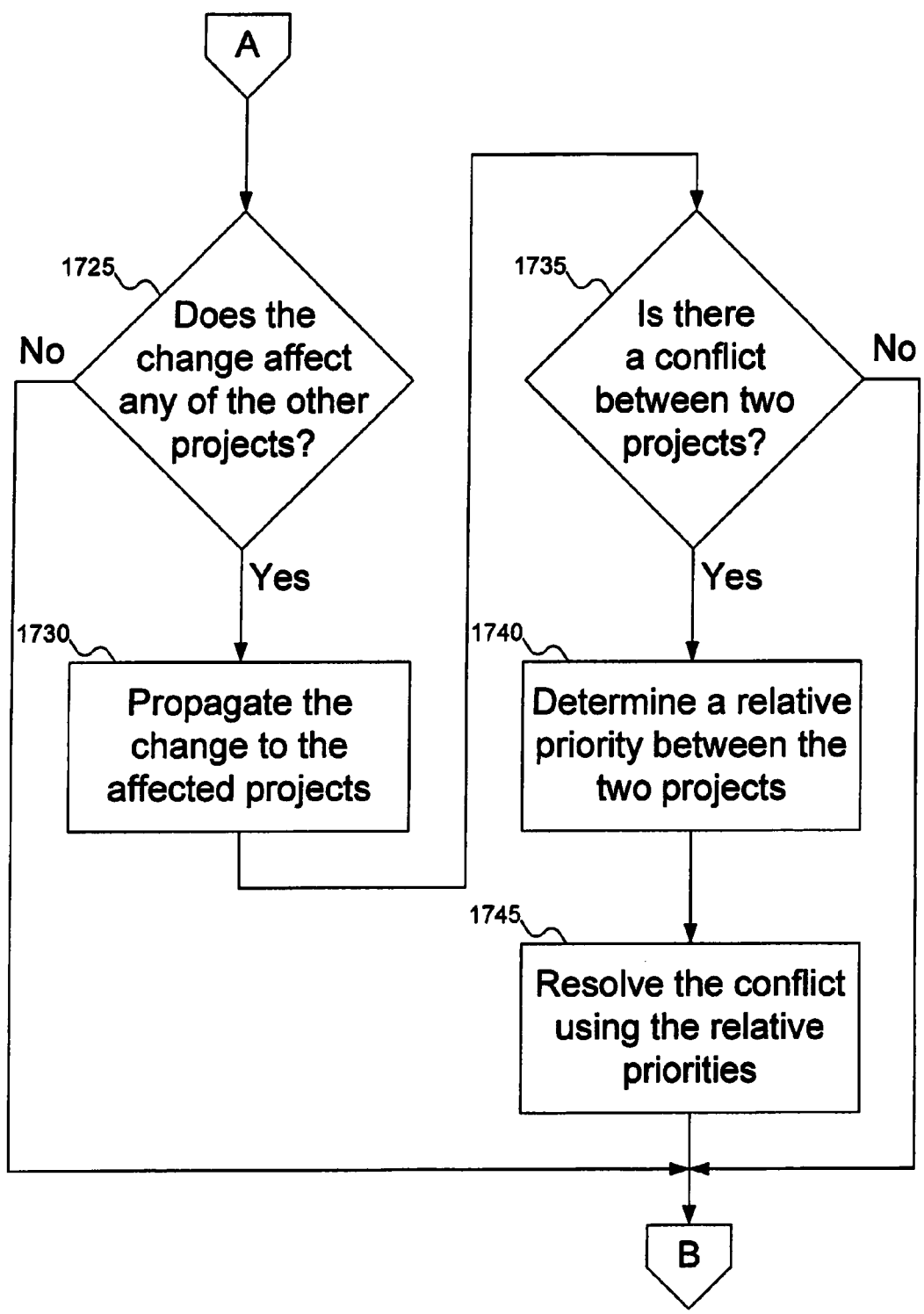

FIGS. 17A-17B show a flowchart of the procedure for propagating changes across projects in the systems of FIGS. 1A-1C, according to an embodiment of the invention. In FIG. 17A, at block 1705, the system receives a change to a project. At block 1710, the system determines whether there are any members of the changed project that have not yet been considered. If there are, then at block 1715, the system determines a user who is member of the project. At block 1720, the system determines other projects of which that user is a member.

At block 1725 (FIG. 17B), the system decides whether or not the change affects any of the other projects. If so, then at block 1730, the change is propagated to the affected projects. At block 1735, the system determines whether the propagated change creates a conflict between the changed project and any of the affected projects. If so, then at block 1740, the system determines a relative priority between the projects, and at block 1745, the system resolves the conflict using the relative priorities.

A person skilled in the art will recognize that blocks 1740 and 1745 represent but one way of resolving conflicts, and that other techniques (such as those described above with reference to FIGS. 15C and 16) may be used to resolve conflicts.

Figure 18A:
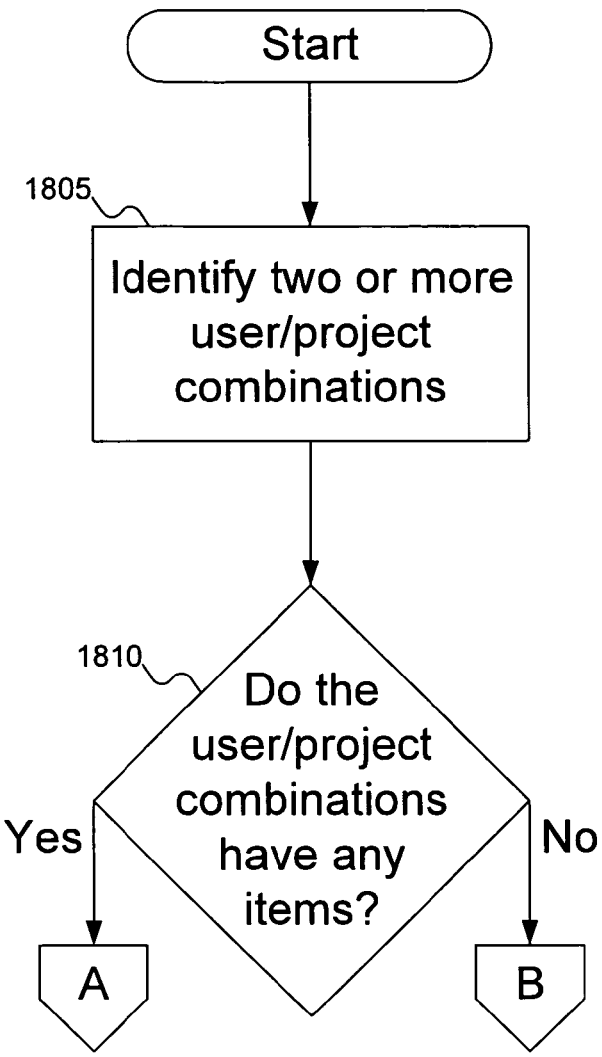
FIGS. 18A-18B show a flowchart of the procedure for rolling up two or more schedules in the systems of FIGS. 1A-1C, according to an embodiment of the invention.
Figure 18B:
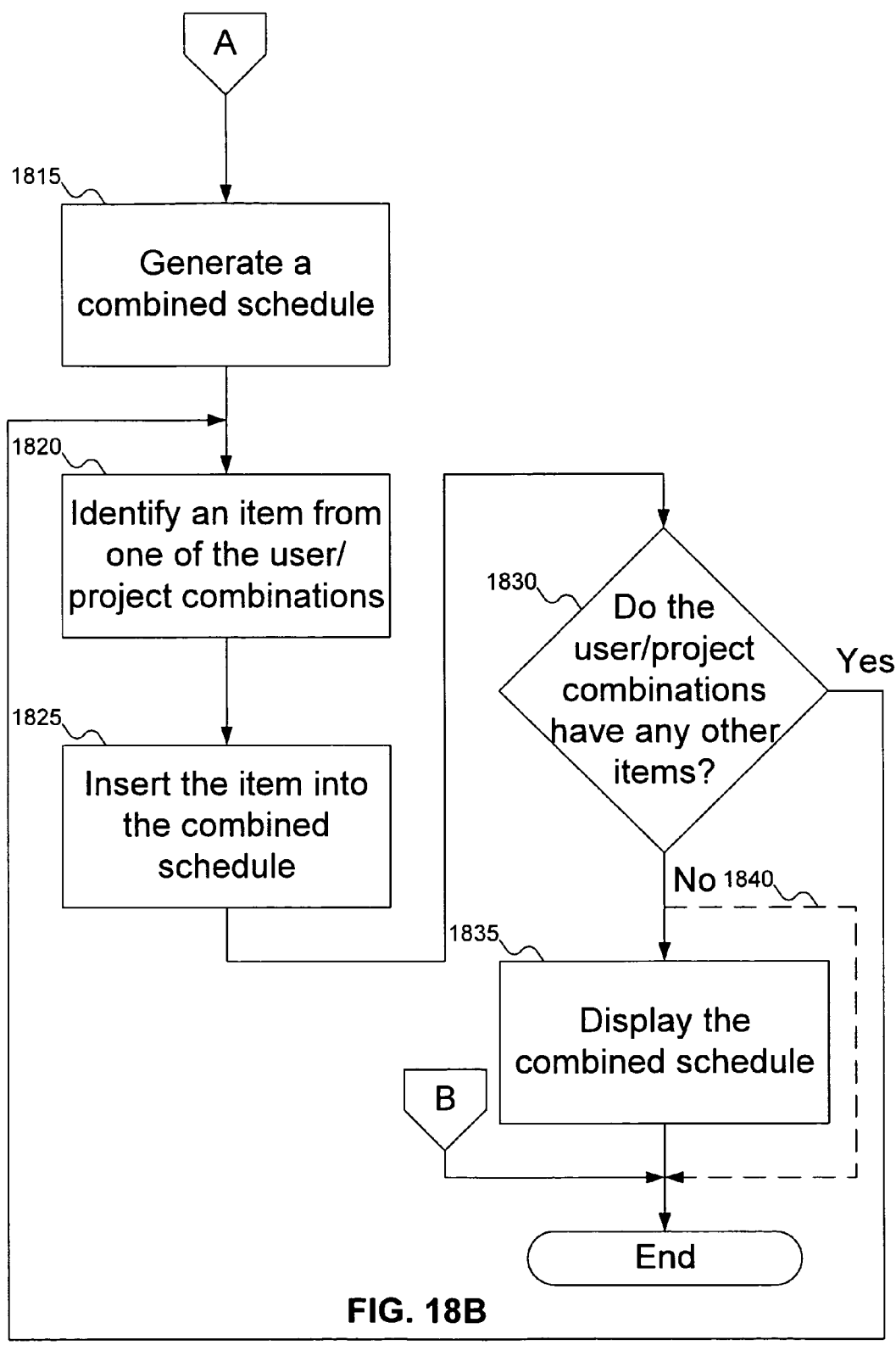

FIGS. 18A-18B show a flowchart of the procedure for rolling up two or more schedules in the systems of FIGS. 1A-1C, according to an embodiment of the invention. In FIG. 18A, at block 1805, the system identifies two or more user/project combinations. At block 1810, the system checks whether there are any items to roll up in a combined schedule.

If there are any items to display in a combined schedule, then at block 1815 (FIG. 18B) the system generates a combined schedule. At block 1820, the system identifies an item from one of the user/project combinations. At block 1825, the system inserts the item into the combined schedule. At block 1830, the system checks to see if there are any remaining items to roll up. If so, then processing returns to block 1820. Otherwise, at block 1835, the system displays the combined schedule. (As indicated by dashed arrow 1840, block 1835 may be omitted.)

Figure 19:
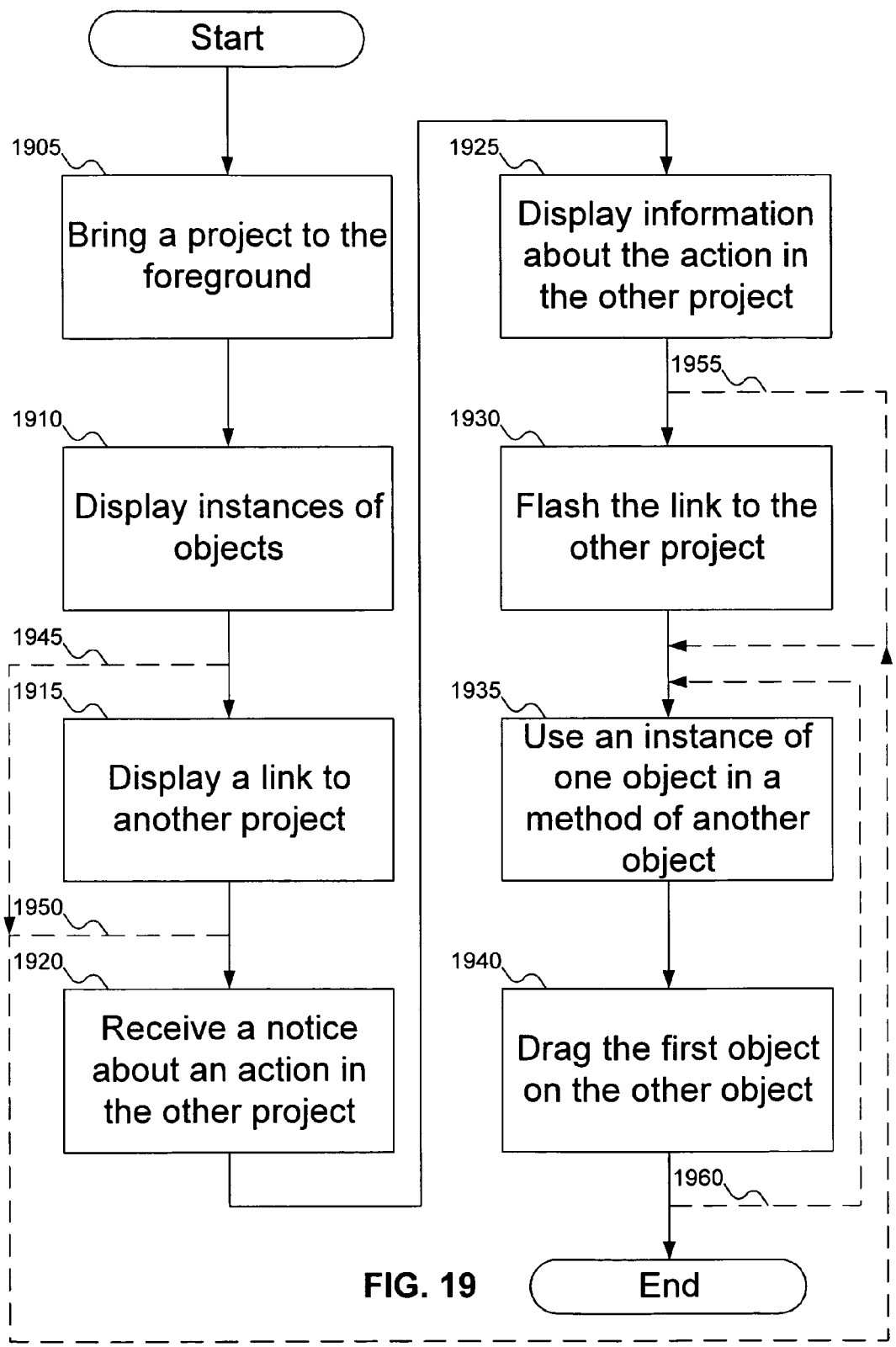
FIG. 19 shows a flowchart of the procedure for using an architecture in the systems of FIGS. 1A-1C, according to an embodiment of the invention.

FIG. 19 shows a flowchart of the procedure for using an architecture in the systems of FIGS. 1A-1C, according to an embodiment of the invention. At block 1905, a project is brought to the foreground. (A person skilled in the art will recognize that block 1905 is equally applicable to the personal workspace or the meeting room as well.) At block 1910, the system displays instances of objects, the instances representing various components of the project space. At block 1915, the system displays a link to another project. At block 1920, the system receives a notice about an action in the other project. At block 1925, the system displays information about the action in the other project to the user. At block 1930, the system flashes the link to the other project, as an alert to the user. At block 1935, the system permits the user to use an instance of one object with a method of another object, perhaps by dragging the first object onto the other object (block 1940).

As shown by dashed arrows 1945, 1950, and 1955, representing different traversals through the flowchart of FIG. 19, some or all of blocks 1915-1935 may be omitted, if desired. In addition, as shown by dashed arrow 1960, blocks 1935-1940 may be repeated, as often as desired.

The following discussion is intended to provide a brief, general description of a suitable machine in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or nonvolatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles. And, though the foregoing discussion has focused on particular embodiments, other configurations are contemplated. In particular, even though expressions such as "in one embodiment" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A system including a computer for at least two users to use an architecture with a first project, the system comprising:
    the computer;
    a memory in the computer;
    a document repository stored in the memory of the computer;
    a team schedule stored in the memory of the computer;
    a user list stored in the memory of the computer, the user list including at least information about a first user, the information about the first user including a predictive mood indicator and data drawn from a set including: a picture, a video segment, an audio segment, a location, a time at the location, an indicator showing if the first user is currently available, and a link to additional data about the first user, so that a second user can access the information about the first user from the user list, the predictive mood indicator operative to predict a mood of the first user based at least on a schedule of the first user and deadlines of the first user;
    a meeting room stored in the memory of the computer;
    at least one tool stored in the memory of the computer; and
    a link to at least a second project stored in the memory of the computer, the link operative to display information about an action that occurred in the second project and, upon selection, to display a second document repository, a second team schedule, a second user list, and a second meeting room, the second document repository, the second team schedule, the second user list, and the second meeting room associated with the second project.

2. A system for using an architecture according to claim 1, wherein each of the document repository, the team schedule, the user list, the meeting room, and the one tool is an instance of an object.

3. A system for using an architecture according to claim 1, wherein the at least one tool includes a chat tool, a search tool, an instant message tool, a meeting scheduler tool, a mail tool, and a contact tool.

4. A system for using an architecture according to claim 1, wherein the information about the first user further includes data describing an input of the first user to the first project.

5. A system for using an architecture according to claim 1 wherein the meeting room includes a persistent store, the persistent store including at least one file that may be accessed by all users listed in the user list.

6. A system for using an architecture according to claim 5, wherein the meeting room further includes a playback of a change to the one file.

7. A system for using an architecture according to claim 6, wherein the playback includes an identity of a user who made the change to the one file and the time the user made the change to the file.

8. A system for using an architecture according to claim 1, wherein the link to the second project includes an indicator if an action has occurred in the second project.

9. A system for using an architecture according to claim 1, wherein the team schedule includes each team member's schedule as it relates to the project.

10. A system for using an architecture according to claim 1, wherein the team schedule includes an identification of work status.

11. A system for using an architecture according to claim 10, wherein the identification of work status indicates whether work is completed or pending.

12. A system for using an architecture according to claim 10, wherein the identification of work status indicates whether work is high priority, low priority, or optional.

13. A system for using an architecture according to claim 1, wherein the team schedule includes a state for a plurality of work phases.

14. A system according to claim 1, wherein the means for exchanging the first project and the second project is operative to exchange the first project and the second project within a project space.

15. A system for using an architecture according to claim 1, wherein the second user can use any of the document repository, the team schedule, the user list, the meeting room, the at least one tool, and the link to at least a second project using a display.

16. A method for using an architecture with a computer, comprising:
    bringing a first project for a user to the foreground of the architecture on a monitor connected to the computer;
    displaying a link to a second project for the user;

displaying on the monitor connected to the computer at least an instant messaging tool, an e-mail tool, a search tool to search for documents, to search for other users, and to search within playbacks of document changes from the meeting room for what changes were made by particular users, a meeting scheduling tool, a contacts list tool, a predictive mood indicator for at least a first user involved in the first project, a first object instance, and a second object instance, the first object instance and the second object instance being instances of objects drawn from a set including: a document repository, a team schedule, a user list, a meeting room, the instant messaging tool, the e-mail tool, the search tool, the meeting scheduling tool, and the contacts list tool, the predictive mood indicator operative to predict a mood of the first user based at least on a schedule of the first user and deadlines of the first user;

receiving a selection of the first object instance and the second object instance from the user;

utilizing a datum from the first object instance in a method of the second object instance;

receiving notice that an action has occurred in the second project;

displaying information about the action that occurred in the second project; and upon selection of the link to the second project, displaying on the monitor connected to the computer at least the instant messaging tool, the e-mail tool, the search tool to search for documents, to search for other users, and to search within playbacks of document changes from the meeting room for what changes were made by particular users, the meeting scheduling tool, the contacts list tool, a second predictive mood indicator for at least a second user involved in the second project, a third object instance, and a fourth object instance, the third object instance and the fourth object instance being instances of objects drawn from a set including: a second document repository, a second team schedule, a second user list, a second meeting room, the instant messaging tool, the e-mail tool, the search tool, the meeting scheduling tool, and the contacts list tool, the second predictive mood indicator operative to predict a mood of the second user based at least on a schedule of the second user and deadlines of the second user.

17. A method according to claim 16, wherein displaying information about the action includes flashing the link to the second project.

18. A method according to claim 16, wherein utilizing a datum includes dragging the first object instance onto the second object instance.

19. A method according to claim 16, wherein displaying information about the action that occurred in the second project includes displaying information about the action that occurred in the second project without exchanging the first project and the second project.

20. An article comprising a machine-accessible storage media having associated data, wherein the data, when accessed, results in a machine performing:

bringing a first project for a user to the foreground;

displaying a link to a second project for the user;

displaying at least an instant messaging tool, an e-mail tool, a search tool to search for documents, to search for other users, and to search within playbacks of document changes from the meeting room for what changes were made by particular users, a meeting scheduling tool, a contacts list tool, a predictive mood indicator for at least a first user involved in the first project, a first object instance, and a second object instance, the first object instance and the second object instance being instances of objects drawn from a set including: a document repository, a team schedule, a user list, a meeting room, the instant messaging tool, the e-mail tool, the search tool, the meeting scheduling tool, and the contacts list tool, the predictive mood indicator operative to predict a mood of the first user based at least on a schedule of the first user and deadlines of the first user;

utilizing a datum from the first object instance in a method of the second object instance;

receiving notice that an action has occurred in the second project; and displaying information about the action that occurred in the second project; and upon selection of the link to the second project, displaying on the monitor connected to the computer at least the instant messaging tool, the e-mail tool, the search tool to search for documents, to search for other users, and to search within playbacks of document changes from the meeting room for what changes were made by particular users, the meeting scheduling tool, the contacts list tool, a second predictive mood indicator for at least a second user involved in the second project, a third object instance, and a fourth object instance, the third object instance and the fourth object instance being instances of objects drawn from a set including: a second document repository, a second team schedule, a second user list, a second meeting room, the instant messaging tool, the e-mail tool, the search tool, the meeting scheduling tool, and the contacts list tool, the second predictive mood indicator operative to predict a mood of the second user based at least on a schedule of the second user and deadlines of the second user.

21. An article according to claim 20, wherein displaying information about the action includes flashing the link to the second project.

22. An article according to claim 20, wherein utilizing a datum includes dragging the first object instance onto the second object instance.

23. An article according to claim 20, wherein displaying information about the action that occurred in the second project includes displaying information about the action that occurred in the second project without exchanging the first project and the second project.

* * * * *